(12) United States Patent
Gullentops et al.

(10) Patent No.: US 8,848,233 B2
(45) Date of Patent: Sep. 30, 2014

(54) METHOD FOR REDUCING IMAGE QUALITY ARTIFACTS IN THREE-DIMENSIONAL PRINTING

(75) Inventors: Chris Gullentops, Kessel-Lo (BE); Rudi Lenders, Hoboken (BE)

(73) Assignee: Agfa Graphics NV, Mortsel (BE)

( * ) Notice: Subject to any disclaimer, the term of this patent is extended or adjusted under 35 U.S.C. 154(b) by 582 days.

(21) Appl. No.: 13/140,437

(22) PCT Filed: Dec. 2, 2009

(86) PCT No.: PCT/EP2009/066182
§ 371 (c)(1), (2), (4) Date: Jun. 17, 2011

(87) PCT Pub. No.: WO2010/069762
PCT Pub. Date: Jun. 24, 2010

(65) Prior Publication Data
US 2011/0249298 A1    Oct. 13, 2011

Related U.S. Application Data

(60) Provisional application No. 61/139,639, filed on Dec. 22, 2008.

(30) Foreign Application Priority Data

Dec. 19, 2008  (EP) .................................... 08172281

(51) Int. Cl.
| | |
|---|---|
| B41C 1/00 | (2006.01) |
| B41J 2/15 | (2006.01) |
| B41J 2/145 | (2006.01) |
| G06K 15/00 | (2006.01) |
| H04N 1/40 | (2006.01) |
| H04N 1/405 | (2006.01) |
| H04N 1/407 | (2006.01) |
| B29C 67/00 | (2006.01) |

(52) U.S. Cl.
CPC ............. *B29C 67/0059* (2013.01); *B41C 1/003* (2013.01)
USPC ......... 358/1.18; 358/3.26; 358/3.29; 358/3.3; 358/3.31; 358/3.32; 347/41

(58) Field of Classification Search
None
See application file for complete search history.

(56) References Cited

U.S. PATENT DOCUMENTS 6,259,962 B1 * 7/2001 Gothait ......................... 700/119
6,679,583 B2   1/2004 Vanhooydonck et al.
(Continued)

FOREIGN PATENT DOCUMENTS

EP      1 428 666 A1    6/2004

OTHER PUBLICATIONS

Official Communication issued in International Patent Application No. PCT/EP2009/066182, mailed on Jul. 22, 2010.

(Continued)

*Primary Examiner* — King Poon
*Assistant Examiner* — Vincent Peren
(74) *Attorney, Agent, or Firm* — Keating & Bennett, LLP

(57) ABSTRACT

A relief print master, such as a flexographic print master or sleeve is created by printing a sequence of intermediate layers on top of each other with an inkjet printing system. The top layer corresponds with the halftoned image that is to be printed by the print master and the lower intermediate layers are supporting layers. The pixels of the intermediate layers that are stacked on top of each other are printed with different nozzles to reduce image quality artifacts. Both a method and a system are described.

9 Claims, 18 Drawing Sheets

(56) References Cited

U.S. PATENT DOCUMENTS

2004/0183796 A1* 9/2004 Velde et al. .................. 345/419
2004/0252174 A1* 12/2004 Baxter et al. ................. 347/101
2008/0062214 A1 3/2008 Silverbrook

OTHER PUBLICATIONS

Gullentops et al., "Image Processing Method for Three-Dimentional Printing," U.S. Appl. No. 13/140,440, filed Jun. 17, 2011.

* cited by examiner

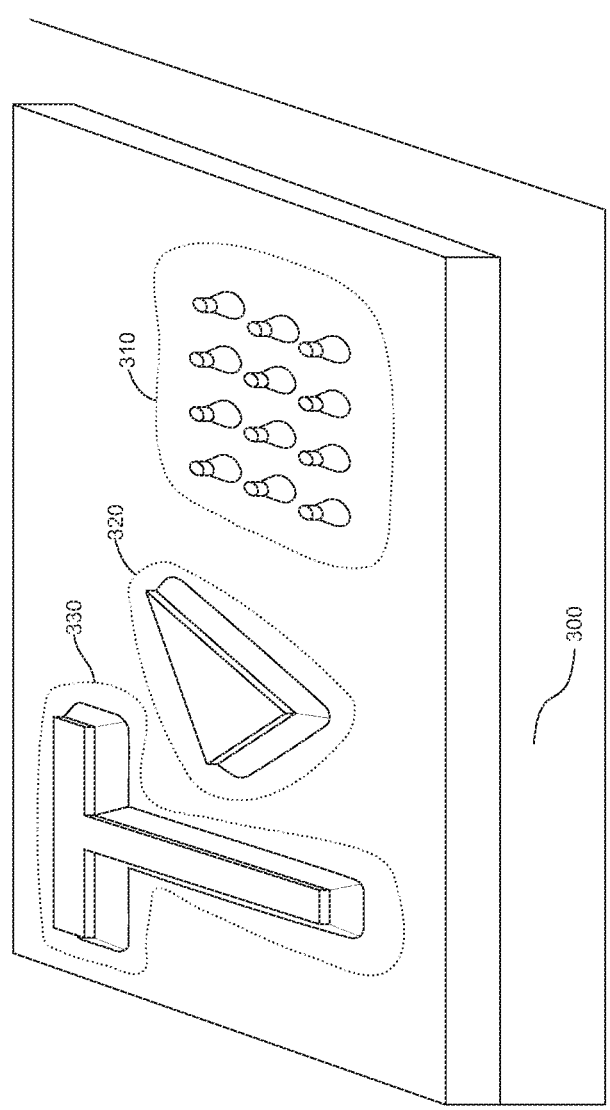
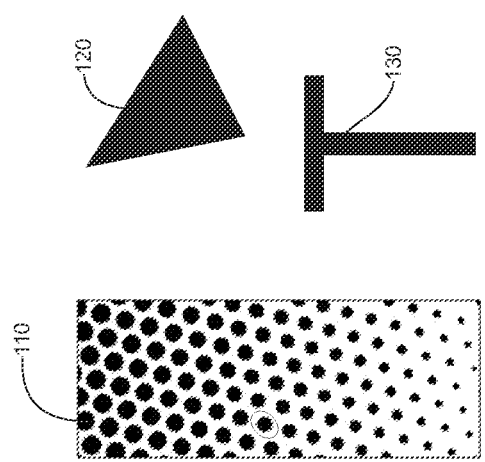

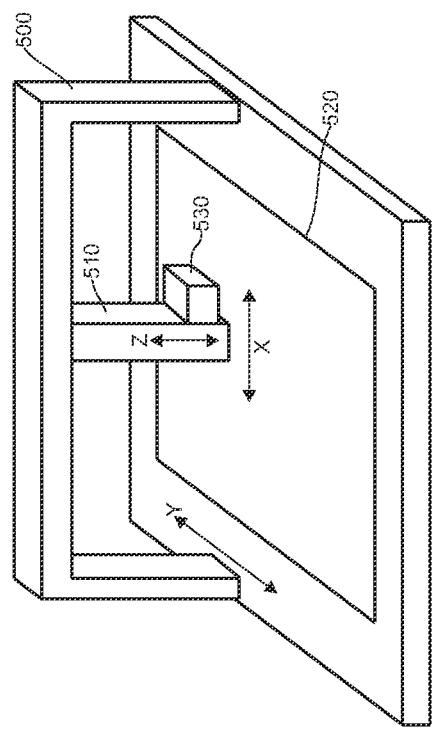
FIG. 5
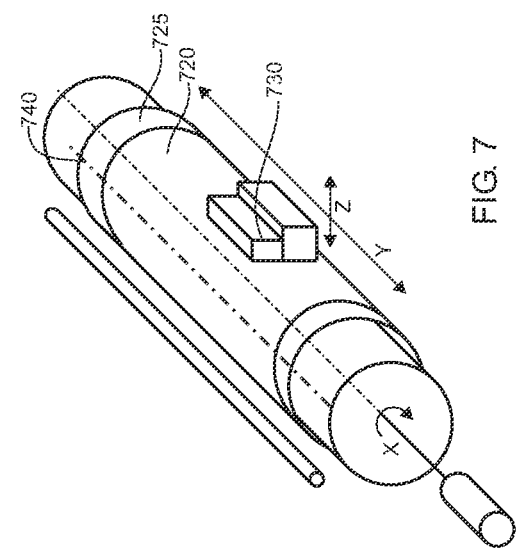
FIG. 10
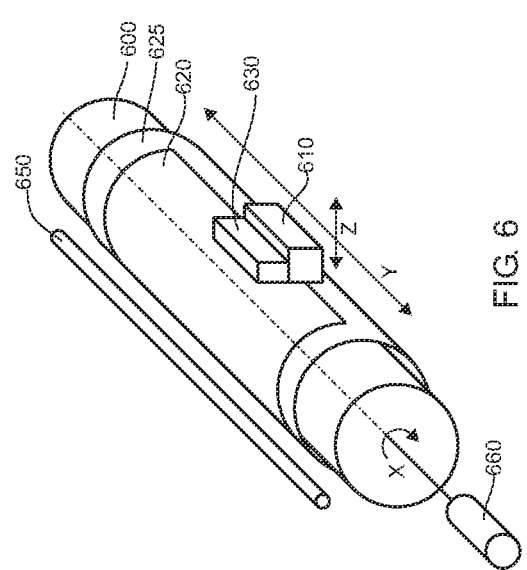
FIG. 7
FIG. 6

FIG. 12

METHOD FOR REDUCING IMAGE QUALITY ARTIFACTS IN THREE-DIMENSIONAL PRINTING

CROSS-REFERENCE TO RELATED APPLICATIONS

This application is a 371 National Stage Application of PCT/EP2009/066182, filed Dec. 2, 2009. This application claims the benefit of U.S. Provisional Application No. 61/139,639, filed Dec. 22, 2008, which is incorporated by reference herein in its entirety. In addition, this application claims the benefit of European Application No. 08172281.1, filed Dec. 19, 2008, which is also incorporated by reference herein in its entirety.

BACKGROUND OF THE INVENTION

1. Field of the Invention

The present invention relates to methods for printing three-dimensional objects, for example using inkjet printing. The method is particularly suited for the case where the three-dimensional object is a relief print master such as a flexographic print master or sleeve. The method consists of first calculating a set of image layers and constructing the print master by printing these layers on top of each other.

The invention specifically relates to methods to reduce image quality artifacts such as banding and streaking that are related to individual nozzles of a printhead and that can occur when intermediate layers are printed on top of each other. Prior art examples of such methods are usually referred to as shingling and interlacing methods.

The present invention also relates to a corresponding printing apparatus for creating the three-dimensional object.

2. Description of the Related Art

Three-dimensional printing is a method for creating three-dimensional objects by depositing or forming thin layers of material in succession on top of each other so as to build up the desired three-dimensional structure. It is sometimes called "Rapid Prototyping and Manufacturing" (RP&M).

Various methods have been devised to create the thin layers.

One technique makes use of a bath of polymerisable liquid material. A thin upper layer of the liquid is cross-linked or hardened in some way, e.g. via laser light in a pattern which is the same as a cross-section through the object to be formed. The laser spot is moved across the surface in accordance with a digital representation of the relevant cross section. After one layer is completed, the liquid level is raised over a small distance and the process is repeated. Each polymerised layer should be sufficiently form-stable to support the next layer.

In another technique powder is dusted onto a substrate and the powder is coalesced by some means, e.g. by selectively heating or hardening the powder, in accordance with a cross-section of the object to be formed.

In yet another method, cross-linkable or hardenable material is deposited in the form of drops which are deposited in a pattern according to the relevant cross-section of the object to be formed.

Still another method involves dispensing drops of molten material at an elevated temperature which then solidify on contact with the cooler work piece.

More information on rapid prototyping, three-dimensional printing, additive fabrication, tooling, and rapid manufacturing is also found in the Wohlers Report 2008, edited and published by Wohlers Associates, Inc., OakRidge Business Park 1511 River Oak Drive in Fort Collins, Colo. 80525 USA.

Printing plates (also referred to as print masters or print forms) are traditionally manufactured using a combination of image wise exposure by a laser or light source followed by a chemical or physical developing step. Such plates are used in a variety of printing methods, such as flexographic printing, letterpress, offset or gravure printing.

Flexographic printing or flexography is a printing process where a cylindrical flexible print master transfers a fast drying ink from an anilox roll to the printable substrate. The print master can be a flexible plate mounted on a cylinder or it can be a cylindrical sleeve.

Flexographic printing plates have the features that define the image that is to be printed in relief, which means that the ink printing area is raised relative to the non ink printing area. An advantage of flexographic printing is that almost any material that can run through a web press can be printed on in this way, including hard surfaced material such as corrugated fiberboard, plastic films or even metal sheets.

European patent application with publication number EP 1 428 666 by Verhoest et al. teaches making a flexographic printing plate using an inkjet apparatus. The plate is formed by applying subsequently on a substrate at least two image-wise layers of polymerisable ink by an inkjet printer. Between the application of the first and second layers, the first layer is immobilized by initiating a polymerization of the ink using a UV source.

Because of manufacturing tolerances, the volume, speed and direction of ink droplets ejected by the nozzles of an inkjet printhead may slightly vary between individual nozzles. It is well known in two-dimensional printing that in absence of any compensating measures this may lead to image quality artifacts such as banding and streaking that are correlated with individual nozzles.

In two-dimensional printing, such banding and streaking artifacts are effectively suppressed by means of interlacing and shingling techniques. One such technique is disclosed in for example the U.S. Pat. No. 6,679,583 assigned to Agfa-Graphics NV. According to the teachings of this patent, pixels on a single row or column of the image are printed by different nozzles. As a result, the effects of individual nozzle variation are spatially diffused so that they become less noticeable. This effectively suppresses the visibility of banding and streaking.

The shingling and interlacing techniques that are disclosed in the prior art can also be used to suppress banding and streaking artifacts in three-dimensional printing. In that case a next intermediate layer is printed on top of a previous intermediate layer, whereby each layer is printed using shingling and interlacing.

For optimal printing performance, it is required that flexographic print plates or sleeves have a top layer that is flat and even. Additionally it is required that mechanical qualities such as strength, resilience and elasticity of the print master are isotropic.

It was found that prior art shingling and interlacing techniques do not always result in the desired degree of flatness and evenness, resulting in a mottled appearance of an image that is printed with such a flexographic printing plate.

From this follows that there is a need for a solution to improve evenness and flatness of the top layer of a flexographic printing plate that is created using three-dimensional printing. In general there is a need to improve the evenness of three-dimensional objects that are created by stackwise printing intermediate layers.

An additional problem with a prior art technique for creating a flexographic print master is that the mechanical properties are insufficiently isotropic.

For example, the adhesion between the subsequent intermediate layers that make up a print master may not be optimal.

Hence there is a need for a method that improves the isotropy of the mechanical characteristics of a flexographic print master that is created with an inkjet system.

SUMMARY OF THE INVENTION

According to a preferred embodiment of the invention a three-dimensional image representing a relief print master such as a print plate or a print sleeve is represented in x, y and z dimensions, whereby the x dimension corresponds with a fast scan orientation of a printing device, the y dimension with a slow scan orientation and the z dimension with the orientation of the relief features of the print master.

The three-dimensional image is subdivided into a top layer and supporting intermediate layers parallel to the x y dimensions.

The layers are printed in such a way that at least two adjacent pixels in the z dimension are printed with different nozzles. This achieves the effect that image quality artifacts correlated to a specific nozzle are spatially diffused in the z dimension. Such spatial diffusion improves the evenness and flatness of the top layer of the relief print master.

In a preferred embodiment, the image quality artifacts related to a specific nozzle are also decorrelated in the x y dimensions by avoiding that neighboring pixels along the x and y dimensions are printed by the same nozzle. This also suppresses correlated image quality artifacts in the x and y dimensions.

According to a preferred embodiment, multiple intermediate image layers of the print master are simultaneously being printed by different sets of nozzles of the same printhead. For example, ink droplets of a lower intermediate layer are being printed by a first set of nozzles at a first location of the print master and are being partially cured. At the same time, ink droplets of an upper intermediate layer are being printed on top of the already printed and partially cured pixels of the lower intermediate layer by a second set of nozzles of the same printhead at a second location.

The printing of ink droplets for an upper layer on top of a matrix of droplets of a partially cured lower layer greatly improves the cohesion between the layers and the isotropy of the mechanical characteristics of the resulting three-dimensional printed structure.

In one preferred embodiment, the method is realized by an inkjet printer in which the fast scan movement of the printhead with regard to the printed substrate is realized by a rotating drum, and whereby the slow scan movement is realized by moving the printhead in a continuous motion parallel to the axis of the drum. In this way, the nozzles of the printhead describe a continuous spiral path relative to the printed substrate. Such a continuous path enables to print a seamless sleeve in one continuous process.

The above-mentioned advantageous effects are realized by a method having the specific features set out below. Specific features for preferred embodiments of the invention are also set out below. Further advantages and preferred embodiments of the present invention will become apparent from the following description and drawings.

BRIEF DESCRIPTION OF THE DRAWINGS

FIG. 1 shows a halftoned image object, a text object and a graphic object.

FIG. 3 shows a perspective view of a relief print master created by using a preferred method according to the current invention for printing an image object 310, a graphic object 320 and a text object 330.

FIG. 5 shows a first preferred embodiment of an apparatus for creating a relief print master according to the current invention.

FIG. 6 shows a second preferred embodiment of an apparatus for creating a relief print master according to the current invention.

FIG. 7 shows a variation of the second preferred embodiment in which a printing plate is replaced by a printing sleeve.

FIG. 10 shows an ordering scheme for filling up a parcel of pixels in an intermediate layer.

FIG. 12 shows how the first intermediate layer is built up during an eight and a ninth revolution of a drum and during the beginning of a tenth revolution.

DETAILED DESCRIPTION OF THE PREFERRED EMBODIMENTS

Figure 2:
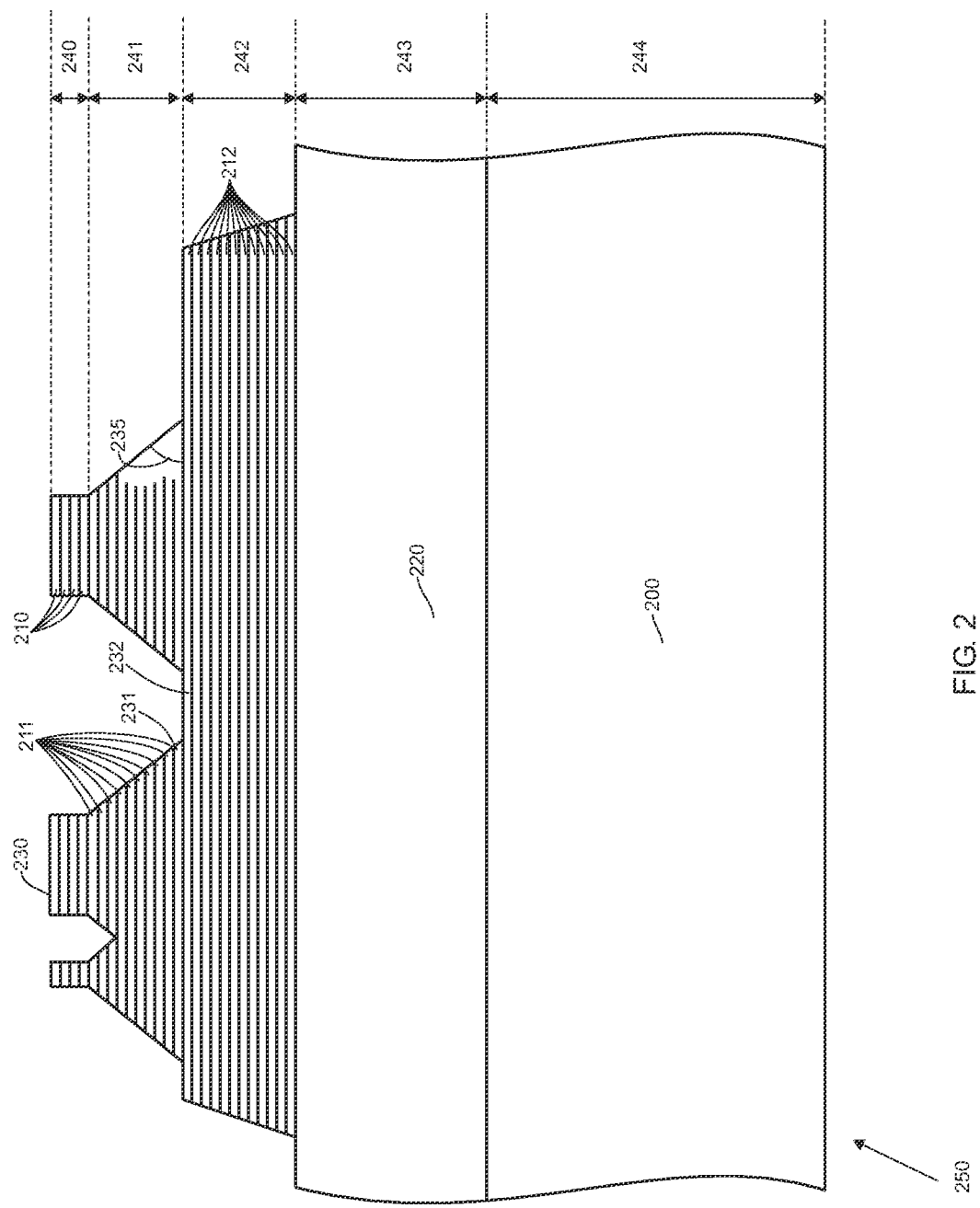
FIG. 2 shows a cross section of a relief print master created by using a preferred embodiment of the current invention.

The drawings in the figures are for explanatory purposes only. The different parts in the drawings are not necessarily rendered using consistent scales.

Print Master

In a preferred embodiment of the current invention, the print master is a positive print master such as a flexographic print master that is created with an inkjet printer.

Optionally it can be a negative print master, in which case the ink is contained in wells with reference to its top surface. An example is a gravure print master.

FIG. 2 shows a cross section of a print master created with a system according to a preferred embodiment of the current invention.

FIG. 3 shows a perspective view of a relief print master comprising a halftoned image object 310, a graphic object 320 and a text object 330.

Flexographic Printing Supports

Two forms of flexographic printing supports 200 can be distinguished: a sheet form and a cylindrical form (sleeve). If the print master is created as a sheet form on a flatbed inkjet device (such as the one shown in FIG. 5), the mounting of the sheet form on a sleeve introduces mechanical distortions that show up as anamorphic distortion in the printed image. This distortion is preferably compensated by an anamorphic pre-compensation in an image processing step prior to halftoning.

Creating the print master on a sleeve, either on a sheet form mounted on the sleeve or directly on a sleeve, for example a seamless sleeve, avoids the problem of geometric distortion altogether. Therefore sleeve forms provide improved registration accuracy and faster change over time on press. Furthermore, sleeves may be well-suited for mounting on an inkjet printer having a rotatable drum. In FIG. 2, a support 200 provides the necessary strength and dimensional stability for handling and mounting the print master. Seamless sleeves have applications in the flexographic printing of continuous designs such as in wallpaper, decoration, gift wrapping paper and packaging.

The term "flexographic printing support", as used in the preferred embodiments of the present invention, encompasses two types of support:

1) a support without elastomeric layers on its surface; and
2) a support with one or more elastomeric layers on its surface.

In a preferred embodiment, the flexographic printing support is a sleeve, which encompasses a basic sleeve and a flexographic printing sleeve.

The term "basic sleeve" means a sleeve without elastomeric layers on its outer surface, while the term "flexographic printing sleeve" means a basic sleeve having one or more elastomeric layers on its outer surface.

Although here below the type of materials, the wall thicknesses, ... are written for sleeves, the same type of materials, wall thicknesses, ... can be used for flexographic printing supports having a sheet form.

Basic Sleeves

The basic sleeve can be any material that is conventionally used to prepare flexographic printing masters. For good printing results, a dimensionally stable support is required. Basic sleeves, often also called a sleeve base, ordinarily consist of composites, such as epoxy or polyester resins reinforced with glass fibre or carbon fibre mesh. Metals, such as steel, aluminium, copper and nickel, and hard polyurethane surfaces (e.g. durometer 75 Shore D) can also be used.

The sleeve may be formed from a single layer or multiple layers of flexible material, as for example disclosed by US 2002/046668 (ROSSINI). Flexible sleeves made of polymeric films can be transparent to ultraviolet radiation and thereby accommodate backflash exposure for building a floor in the cylindrical printing element. Multiple layered sleeves may include an adhesive layer or tape between the layers of flexible material. Preferred is a multiple layered sleeve as disclosed in U.S. Pat. No. 5,301,610 (DU PONT). The sleeve may also be made of non-transparent, actinic radiation blocking materials, such as nickel or glass epoxy.

Depending upon the type of tubing and the number of layers of mesh applied, the wall thickness of these sleeve bases varies. The sleeve typically has a wall thickness from 0.1 to 1.5 mm for thin sleeves and from 2 mm to as high as 100 mm for other sleeves.

For thick sleeves often combinations of a hard polyurethane surface with a low-density polyurethane foam as an intermediate layer combined with a fiberglass reinforced composite core are used as well as sleeves with a highly compressible surface present on a sleeve base.

Depending upon the specific application, sleeve bases may be conical or cylindrical. Cylindrical sleeve bases are used primarily in flexographic printing.

As press speeds have increased, press bounce has become a more frequent problem. Various approaches can be taken to reduce press bounce, including the use of cushioned sleeves. Sleeves come in different constructions, e.g. with a hard or a compressible core or surface, with varying wall thicknesses.

The basic sleeve or flexographic printing sleeve is stabilized by fitting it over a steel roll core known as an air mandrel or air cylinder. Air mandrels are hollow steel cores which can be pressurized with compressed air through a threaded inlet in the end plate wall. Small holes drilled in the cylindrical wall serve as air outlets. The introduction of air under high pressure permits it to float into position over an air cushion. Certain thin sleeves are also expanded slightly by the compressed air application, thereby facilitating the gliding movement of the sleeve over the roll core.

Foamed adapter or bridge sleeves are used to "bridge" the difference in diameter between the air-cylinder and a flexographic printing sleeve containing the printing relief. The diameter of a sleeve depends upon the required repeat length of the printing job.

Flexographic Printing Sleeves

A flexographic printing sleeve is a basic sleeve provided with one or more elastomeric layers. The elastomeric layers may be any material that is conventionally used to prepare flexographic printing masters. The elastomeric layers are preferably partially or fully cured photopolymer layers, but can also be rubber or polyurethane layers. It is also possible to use a partially or fully cured conventional UV exposure flexographic printing form precursor as flexographic printing sleeve. A wide variety of such conventional flexographic printing form precursors are commercially available.

A printing relief can be formed in several ways on the flexographic printing sleeve. In a preferred embodiment the relief is formed by inkjet printing on the one or more elastomeric layers already present as an "elastomeric floor 220". In the latter, the one or more elastomeric layers are preferably partially cured layers to enhance the adhesion of the relief jetted onto the elastomeric layers. Alternatively the elastomeric floor may also be applied to the surface of the basic sleeve by inkjet printing.

In another preferred embodiment, the elastomeric layers are fully cured and the relief is formed by laser engraving. In laser engraving, the elastomeric layers of a different hardness can be used to obtain the desired hardness.

In another preferred embodiment the flexographic printing sleeve is prepared by a coating method as disclosed in WO 2008/034810 (AGFA GRAPHICS).

Different types of printing applications require flexographic printing forms with differing degrees of hardness. Softer flexographic printing forms are more suited for rough substrates because they can better cover the highs and lows. The harder flexographic printing forms are used for even and smooth substrates. The optimum hardness of a flexographic printing form also depends on whether the image is solid or halftone. Softer flexographic printing forms will transfer the ink better in solid areas, though harder flexographic printing forms have less dot gain. The hardness is a measure of the printing form's mechanical properties which is measured in degree of Shore A. For example, printing on corrugated board requires usually a hardness of 35° Shore A, whereas for reel presses 65° to 75° Shore A is a standard.

Depending on the substrate to be printed upon, the hardness and thickness of the flexographic printing form have to be adjusted by controlling the amount of the curable liquid that is printed, its composition and its degree of curing. Depending on the application, the relief depth varies from 0.2 to 4 mm, preferably from 0.4 to 2 mm.

In a preferred embodiment of the current invention, a relief is applied by an inkjet printing device by applying imagewise on a support subsequent layers of radiation curable liquid by an inkjet printing device whereby an applied layer is preferably immobilized using a curing device before a subsequent layer is applied. The curing does not have to be a full cure, but can be a partial cure. Optionally some of the layers are not cured directly after jetting the layer, but after jetting of a subsequent layer. In a preferred embodiment, each applied layer is immobilized using the curing device before a subsequent layer is applied.

In a preferred embodiment of the present invention of the method for making a flexographic printing master, the relief includes a so-called "mesa relief" as shown by the flexographic printing master (250) in FIG. 2. The layers (212) together define a "mesa relief". Such a mesa relief is only present in those parts of the flexographic printing master comprising image features such as text, graphics and halftone images. In extended areas where such image features are absent, there is no mesa relief.

A mesa relief preferably has a height (242) in a range from 50 μm to 1 mm, for example 0.5 mm.

The layers (210), (211) and (212) in FIG. 2 define the actual printing relief of the flexographic printing master. The layers (210) and (211) in FIG. 2 define the image relief. The top layer (230) corresponds with a halftone bitmap that defines the image that is to be printed by the printing master. The layers (210) are preferably identical in shape and size as the top layer (230), producing a vertical relief slope and defining a "top hat segment". Such a top hat may have a height (240) between 10 and 500 μm and preferably between 20 and 200 μm. A vertical relief slope for a top hat segment has the advantage that the printing surface (230) remains consistent during printing, even when pressure variations occur between the print master and the anilox roller or between the print master and the printable substrate, or when the printing master wears off.

The intermediate layers (211), together forming a sloped segment, are preferably printed with a slope having an angle (235) that is less than 90 degrees. The angle can be between 25 and 75 degrees, preferably between 40 and 60 degrees, for example 50 degrees. The angle (235) can be controlled by controlling the height (241) of the individual layers, their number and the difference in size between subsequent layers.

Using a lower slope angle (235) has the advantage that small features on the print master will suffer less from buckling. The total height (241) of the intermediate layers (211) is for example between 30 μm and 700 μm, preferably between 50 μm and 250 μm.

In a more preferred embodiment of the current invention, the intermediate layers (210), (211) and (212) are printed in multiple passes with an ink jet printer that jets a radiation curable liquid in combination with a curing device. Each intermediate layer is solidified by a curing device immediately after printing. Especially the upper layer (232) of the mesa relief is preferably only partially cured for ensuring a good adhesion with the lowest intermediate layer (231) of the sloped segment (211). Optionally a final curing step is carried out to further harden the layers after all of them have been printed.

The mesa relief is preferably printed on an elastomeric support floor (220) that provides the necessary resilience to the flexographic printing master. Such an elastomeric floor can, for example, be obtained by layer-wise spraying or jetting a radiation curable liquid on the support and curing the layers by means of a UV curing source. The height (243) of an elastomeric floor (220) is preferably between 0.3 mm and 2 mm.

The elastomeric floor (220) may itself be supported by a support (200). A support (200) of a sheet form typically has a height (244) from 0.005 to 0.127 cm. A preferred height (244) for the sheet form is 0.007 to 0.040 cm. A sleeve form typically has a wall height (244) from 0.1 to 1 mm for thin sleeves and from 1 to as much as 100 mm for other sleeves. The selection of the height (244) depends upon the application.

Curable Liquid Composition (Ink)

The ink that is used for printing the intermediate layers 210, 211 and 212 is a liquid that is curable by actinic radiation which can be UV light, IR light or visible light. Preferably the radiation curable liquid is a UV curable liquid.

The radiation curable liquid preferably contains at least a photo-initiator and a polymerisable compound. The polymerisable compound can be a monofunctional or polyfunctional monomer, oligomer or pre-polymer or a combination thereof.

The radiation curable liquid may be a cationically curable liquid but is preferably a free radical curable liquid.

The free radical curable liquid preferably contains substantially acrylates rather than methacrylates for obtaining a high flexibility of the applied layer. Also the functionality of the polymerisable compound plays an important role in the flexibility of the applied layer. Preferably a substantial amount of monofunctional monomers and oligomers are used.

In a preferred embodiment of the present invention, the radiation curable liquid includes:
 a) a photoinitiator; and
 b) a polymerizable compound selected from the group consisting of lauryl acrylate, polyethyleneglycol diacrylate, polyethylene glycol dimethacrylate, 2-(2-ethoxyethoxy) ethyl acrylate, 2-phenoxyethyl acrylate, 2-phenoxyethyl methacrylate, propoxylated neopentylglycol diacrylate, alkoxylated hexanediol diacrylate, isobornylacrylate, isodecyl acrylate, hexane diol diacrylate, caprolacton acrylate and urethane acrylates.

In a more preferred embodiment of the present invention, the radiation curable liquid includes an aliphatic urethane acrylate. Aromatic type urethane acrylates are less preferred.

In an even more preferred embodiment, the urethane acrylate is a urethane monoacrylate. Commercial examples include GENOMER™ 1122 and EBECRYL™ 1039.

The flexibility of a given urethane acrylate can be enhanced by increasing the linear molecular weight between cross links. Polyether type urethane acrylates are for flexibility also more preferred than polyester type urethane acrylates.

Preferably the radiation curable liquid does not include amine modified polyether acrylates which reduce the flexibility of the cured layer.

An elastomer or a plasticizer is preferably present in the radiation curable liquid for improving desired flexographic properties such as flexibility and elongation at break.

The radiation curable liquid may contain a polymerization inhibitor to restrain polymerization by heat or actinic radiation.

The radiation curable liquid may contain at least one surfactant for controlling the spreading of the liquid.

The radiation curable liquid may further contain at least one colorant for increasing contrast of the image on the flexographic print master.

The radiation curable liquid may further contain at least one acid functionalized monomer or oligomer.

The radiation curable liquid preferably has a viscosity at a shear rate of 100 s−1 and at a temperature between 15 and 70° C. of not more than 100 mPa·s, preferably less than 50 mPa·s, and more preferably less than 15 mPa·s.

*Monofunctional Monomers*

Any polymerisable monofunctional monomer commonly known in the art may be employed. Particular preferred polymerisable monofunctional monomers are disclosed in paragraphs [0054] to [0058] of EP 1637926 A (AGFA).

Two or more monofunctional monomers can be used in combination.

The monofunctional monomer preferably has a viscosity smaller than 30 mPa·s at a shear rate of 100 s−1 and at a temperature between 15 and 70° C.

*Polyfunctional Monomers and Oligomers*

Any polymerisable polyfunctional monomer and oligomer commonly known in the art may be employed. Particular preferred polyfunctional monomers and oligomers are disclosed in paragraphs [0059] to [0063] of EP 1637926 A (AGFA).

Two or more polyfunctional monomers and/or oligomers can be used in combination.

The polyfunctional monomer or oligomer preferably has a viscosity larger than 50 mPa·s at a shear rate of 100 s−1 and at a temperature between 15 and 70° C.

*Acid Functionalized Monomers and Oligomers*

Any polymerisable acid functionalized monomer and oligomer commonly known in the art may be employed. Particular preferred acid functionalized monomers and oligomers are disclosed in paragraphs [0066] to [0070] of EP 1637926 A (AGFA).

*Photo-Initiators*

The photo-initiator, upon absorption of actinic radiation, preferably UV-radiation, forms free radicals or cations, i.e. high-energy species inducing polymerization and crosslinking of the monomers and oligomers in the radiation curable liquid.

A preferred amount of photo-initiator is 1 to 10% by weight, more preferably 1 to 7% by weight, of the total radiation curable liquid weight.

A combination of two or more photo-initiators may be used. A photo-initiator system, comprising a photo-initiator and a co-initiator, may also be used. A suitable photo-initiator system comprises a photo-initiator, which upon absorption of actinic radiation forms free radicals by hydrogen abstraction or electron extraction from a second compound, the co-initiator. The co-initiator becomes the actual initiating free radical.

Irradiation with actinic radiation may be realized in two steps, each step using actinic radiation having a different wavelength and/or intensity. In such cases it is preferred to use 2 types of photo-initiators, chosen in function of the different actinic radiation used.

Suitable photo-initiators are disclosed in paragraphs [0077] to [0079] of EP 1637926 A (AGFA).

*Inhibitors*

Suitable polymerization inhibitors include phenol type antioxidants, hindered amine light stabilizers, phosphor type antioxidants, hydroquinone monomethyl ether commonly used in (meth)acrylate monomers, and hydroquinone, methylhydroquinone, t-butylcatechol, pyrogallol may also be used. Of these, a phenol compound having a double bond in molecules derived from acrylic acid is particularly preferred due to its having a polymerization-restraining effect even when heated in a closed, oxygen-free environment. Suitable inhibitors are, for example, SUMILIZER™ GA-80, SUMILIZER™ GM and SUMILIZER™ GS produced by Sumitomo Chemical Co., Ltd.

Since excessive addition of these polymerization inhibitors will lower the sensitivity to curing of the radiation curable liquid, it is preferred that the amount capable of preventing polymerization be determined prior to blending. The amount of a polymerization inhibitor is generally between 200 and 20,000 ppm of the total radiation curable liquid weight.

*Oxygen Inhibition*

Suitable combinations of compounds which decrease oxygen polymerization inhibition with radical polymerization inhibitors are: 2-benzyl-2-dimethylamino-1-(4-morpholinophenyl)-butane-1 and 1-hydroxy-cyclohexyl-phenyl-ketone; 1-hydroxy-cyclohexyl-phenyl-ketone and benzophenone; 2-methyl-1[4-(methylthio)phenyl]-2-morpholino-propane-1-on and diethylthioxanthone or isopropylthioxanthone; and benzophenone and acrylate derivatives having a tertiary amino group, and addition of tertiary amines. An amine compound is commonly employed to decrease an oxygen polymerization inhibition or to increase sensitivity. However, when an amine compound is used in combination with a high acid value compound, the storage stability at high temperature tends to be decreased. Therefore, specifically, the use of an amine compound with a high acid value compound in ink-jet printing should be avoided.

Synergist additives may be used to improve the curing quality and to diminish the influence of the oxygen inhibition. Such additives include, but are not limited to ACTILANE™ 800 and ACTILANE™ 725 available from AKZO NOBEL, EBECRYL™ P115 and EBECRYL™ 350 available from UCB CHEMICALS and CD 1012, CRAYNOR™ CN 386 (amine modified acrylate) and CRAYNOR™ CN 501 (amine modified ethoxylated trimethylolpropane triacrylate) available from CRAY VALLEY.

The content of the synergist additive is in the range of 0 to 50% by weight, preferably in the range of 5 to 35% by weight, based on the total weight of the radiation curable liquid.

*Plasticizers*

Plasticizers are usually used to improve the plasticity or to reduce the hardness of adhesives, sealing compounds and coating compositions. Plasticizers are liquid or solid, generally inert organic substances of low vapor pressure.

Suitable plasticizers are disclosed in paragraphs [0086] to [0089] of EP 1637926 A (AGFA).

The amount of plasticizer is preferably at least 5% by weight, more preferably at least 10% by weight, each based on the total weight of the radiation curable liquid.

The plasticizers may have molecular weights up to 30,000 but are preferably liquids having molecular weights of less than 5,000.

*Elastomers*

The elastomer may be a single binder or a mixture of various binders. The elastomeric binder is an elastomeric copolymer of a conjugated diene-type monomer and a polyene monomer having at least two non-conjugated double bonds, or an elastomeric copolymer of a conjugated diene-type monomer, a polyene monomer having at least two non-conjugated double bonds and a vinyl monomer copolymerizable with these monomers.

Preferred elastomers are disclosed in paragraphs [0092] and [0093] of EP 1637926 A (AGFA).

*Surfactants*

The surfactant(s) may be anionic, cationic, non-ionic, or zwitter-ionic and are usually added in a total quantity below 20% by weight, more preferably in a total quantity below 10% by weight, each based on the total radiation curable liquid weight.

A fluorinated or silicone compound may be used as a surfactant, however, a potential drawback is bleed-out after image formation because the surfactant does not cross-link. It is therefore preferred to use a copolymerizable monomer having surface-active effects, for example, silicone-modified acrylates, silicone modified methacrylates, fluorinated acrylates, and fluorinated methacrylates.

*Colorants*

Colorants may be dyes or pigments or a combination thereof. Organic and/or inorganic pigments may be used.

Suitable dyes and pigments include those disclosed by ZOLLINGER, Heinrich. Color Chemistry: Syntheses, Properties, and Applications of Organic Dyes and Pigments. 3rd edition. WILEY-VCH, 2001. ISBN 3906390233. p. 550.

Suitable pigments are disclosed in paragraphs [0098] to [0100] of EP 1637926 A (AGFA).

The pigment is present in the range of 0.01 to 10% by weight, preferably in the range of 0.1 to 5% by weight, each based on the total weight of radiation curable liquid.

*Solvents*

The radiation curable liquid preferably does not contain an evaporable component, but sometimes, it can be advantageous to incorporate an extremely small amount of a solvent to improve adhesion to the ink-receiver surface after UV curing. In this case, the added solvent may be any amount in the range of 0.1 to 10.0% by weight, preferably in the range of 0.1 to 5.0% by weight, each based on the total weight of radiation curable liquid.

*Humectants*

When a solvent is used in the radiation curable liquid, a humectant may be added to prevent the clogging of the nozzle, due to its ability to slow down the evaporation rate of radiation curable liquid.

Suitable humectants are disclosed in paragraph [0105] of EP 1637926 A (AGFA).

A humectant is preferably added to the radiation curable liquid formulation in an amount of 0.01 to 20% by weight of the formulation, more preferably in an amount of 0.1 to 10% by weight of the formulation.

*Biocides*

Suitable biocides include sodium dehydroacetate, 2-phenoxyethanol, sodium benzoate, sodium pyridinethion-1-oxide, ethyl p-hydroxy-benzoate and 1,2-benzisothiazolin-3-one and salts thereof. A preferred biocide for the radiation curable liquid suitable for the method for manufacturing a flexographic print master according to a preferred embodiment of the present invention, is PROXEL™ GXL available from ZENECA COLOURS.

A biocide is preferably added in an amount of 0.001 to 3% by weight, more preferably in an amount of 0.01 to 1.00% by weight, each based on radiation curable liquid.

*Preparation of Radiation Curable Liquids*

The radiation curable liquid may be prepared as known in the art by mixing or dispersing the ingredients together, optionally followed by milling, as described for example in paragraphs [0108] and [0109] of EP 1637926 A (AGFA).

Apparatus for Creating the Print Master

FIGS. 5 to 7 show various preferred embodiments of an apparatus that can be used to create a relief print master using a method according to the current invention.

FIG. 5 shows a flatbed printing device. A printhead 510 can move relatively to a support layer 520 in a fast scan dimension x for printing a first swath of pixels. The printhead can also move in a slow scan dimension y for printing a next swath of pixels. In FIG. 5 the z dimension indicates the direction of the relief features of the print master that is to be created by the printing device. During operation, the printhead 510 prints ink droplets that are partially cured by the partial curing station 530.

FIG. 6 shows a drum based printing device.

A sleeve 625 is mounted on a drum 600 that is driven by a motor 660 in a rotational direction x, which corresponds with a fast scan dimension x. The sleeve carries a sheet of support layer 620.

A printhead 630 is mounted on a carriage (not shown) that can move in the y direction parallel to the axle of the drum and which corresponds with a slow scan dimension y.

During operation, the combination of the rotation x and translation y of the printhead enables to print intermediate layers on the substrate. During the printing, partial curing takes place of a printed intermediate layer by the curing source 610.

Optionally the printed intermediate layers can be subject to a post curing step by rotating the drum 600 while a final curing source 650 is turned on.

FIG. 7 is similar to FIG. 6, except that the support layer 720 in this case is a cylindrical surface, which is a preferred embodiment according to the current invention. This set up enables the printing of a three-dimensional image on the cylindrical surface in a continuous and seamless fashion. According to this preferred embodiment, the position of the printhead 730 moves linearly in the slow scan dimension y as a function of the angular rotation of the drum in the x direction. The effect of this is that every nozzle of the printhead describes a continuous and spiral motion relative to a fixed position on the drum.

The line 740 in FIG. 7 refers to a "date line", which is an imaginary line at a fixed angular position on the surface of the sleeve parallel to the axis of the drum.

Printhead

An example of a printhead according to a preferred embodiment of the current invention is capable to eject droplets having a volume between 0.1 and 100 pl. and preferably between 1 and 30 pl. Even more preferably the droplet volume is in a range between 1 pl and 8 pl. Even more preferably the droplet volume is only 2 or 3 pl.

The dot placement precision with regard to the theoretical addressable print grid is for example less than +/−3 micron in 99.73% (three sigma) of the printed pixels.

The printhead has an addressable grid having a square pitch of for example 70 micrometer.

Curing Source

Just after the deposition of ink drops by the printhead on the substrate they are exposed by a curing source. This provides immobilization and prevents the droplets to run out, which would deteriorate the quality of the print master.

Curing can be partial or full. A partial cure is defined as a degree of curing wherein at least 5%, preferably 10%, of the functional groups in the coated formulation is converted. A full cure is defined as a degree of curing wherein the increase in the percentage of converted functional groups, with increased exposure to radiation (time and/or dose), is negligible. A full cure corresponds with a conversion percentage that is within 10%, preferably 5%, from the maximum conversion percentage defined by the horizontal asymptote in the RT-FTIR graph (percentage conversion versus curing energy or curing time).

The most important parameters when selecting a curing source are the spectrum and the intensity of the UV-light. Both parameters affect the speed of the curing.

Short wavelength UV light (such from a UV-C source) has poor penetration and enables to cure droplets primarily on the outside.

A typical UV-C light source is low pressure mercury vapor electrical discharge bulb. Such a source has a wide spectral distribution of energy, but with a strong peak in the short wavelength region of the UV spectrum.

Long wavelength UV light (such as from a UV-A source) has better penetration properties. A typical UV-A source is a medium or high pressure mercury vapor electrical discharge bulb. Recently UV-LEDS have become commercially available which also emit in the UV-A spectrum and that have the potential to replace gas discharge bulb UV sources.

By doping the mercury gas in discharge bulb with iron or gallium, an emission can be obtained that covers both the UV-A and the UV-C spectrum.

The effect of the spectrum and intensity of a curing source on curing an ink can also be affected by including dyes in an ink that absorb energy in a part of the spectrum of a curing source.

The intensity of a curing source has a direct effect on curing speed. A high intensity results in higher curing speeds. The curing speed should be sufficiently high to avoid oxygen inhibition of free radicals that propagate during curing. Such inhibition not only decreases curing speed, but also negatively affects the conversion ratio of monomer into polymer.

An intermediate layer 210, 211 and 212 (such as in FIG. 2) is preferably immediately after having being printed a least partially cured so that the layer is solidified but still contains residual monomer. This approach improves the adhesion properties of layers that are subsequently printed on top of each other.

Partial intermediate curing is possible with UV-C light, UV-A light or with broad spectrum UV light. The use of UV-C light polymerizes the outer skin of an intermediate layer. On the other hand, it reduces the availability of monomer in the outer skin and this negatively impacts the adhesion between subsequent intermediate layers. A better solution therefore exists to provide partial curing with a UV-A source under a nitrogen atmosphere. This solution both suppresses oxygen inhibition and optimizes adhesion between subsequent intermediate layers.

A final post curing is realized with UV-C light or with broad spectrum UV light. Final curing with UV-C light has the property that the outside skin of the print master is fully hardened.

It is important to avoid that light—even stray light—from a curing source reaches the nozzles of a printhead, because this would cause the ink to polymerize in the nozzles, causing them to become ineffective. For this reason, a curing source and a printhead should be sufficiently spaced apart, or a screen should be placed in between both. In the set up of FIG. 6, a solution consists of placing the UV curing source for example 180 degrees apart from the printhead with regard to the axle of the cylindrical drum.

Rendering of a Digital Image

The image that is to be printed can be any digital image that can be represented as a raster bitmap.

A typical image comprises multiple objects such as photographs, graphic objects such as polygons and line work and text objects.

These objects are usually generated using a page description language and are rendered into a digital image by a raster image processor (RIP) such as made available by the company Adobe Systems Incorporated.

The image can be monochrome or color. In the latter case, the color image is first separated into a set of ink separations that correspond with a set of corresponding printing inks.

Halftoning refers to an image processing technique for rendering images having multiple densities on a rendering system with a restricted density resolution. For example, a digital image has pixels with a density resolution of 8 bits (256 shades) and is rendered on a binary printing system having only two shades of density corresponding with ink or no ink.

A binary halftoned image is represented by a halftone bitmap in which the color of every bit indicates whether ink or no ink is to printed at the corresponding location.

Halftoning can be AM (amplitude modulation), FM (frequency modulation) or XM (hybrid halftoning).

In AM halftoning, the grid points of a periodical grid contain clusters of pixels ("halftone dots") of which the sizes are modulated to simulate different densities in the digital image.

An example of a moiré free AM halftoning method for color images is disclosed in the U.S. Pat. No. 5,155,599 invented by Delabastita and assigned to Agfa-Graphic NV. FIG. 1 shows an example of a degrade that has been rendered with AM screening.

In FM screening, the distance between fixed sized halftone dots is varied to simulate different densities. An example of an FM screening method particularly suitable for creating print masters with ink jet is disclosed in U.S. Pat. No. 6,962,400 invented by Minnebo et al. and assigned to Agfa-Graphics NV.

Hybrid screening is a mixed form of AM and FM halftoning in which a combination is used of different halftone dot sizes and distances to modulate densities in the original digital image. An example of hybrid screening is the "Sublima XM screening" product manufactured and marketed by Agfa-Graphics NV.

Whereas a preferred embodiment of the current invention uses AM or XM screening, it can just as well be used in combination with FM screening.

FIG. 1 shows an example of a binary halftoned bitmap comprising a AM halftoned image object 110, a solid graphic object 120 and a solid text object 130.

Calculating Intermediate Layers 210, 211 and 212 in FIG. 2

The top layer 230 and intermediate layers 210 in FIG. 2 correspond with the halftone bitmap. This binary halftoned bitmap is directly obtainable from the raster image processor.

The areas of the intermediate layers 211 in FIG. 2 are such that every lower layer completely supports the upper layers by having an area that is larger than the area of the upper layers.

Figure 4:
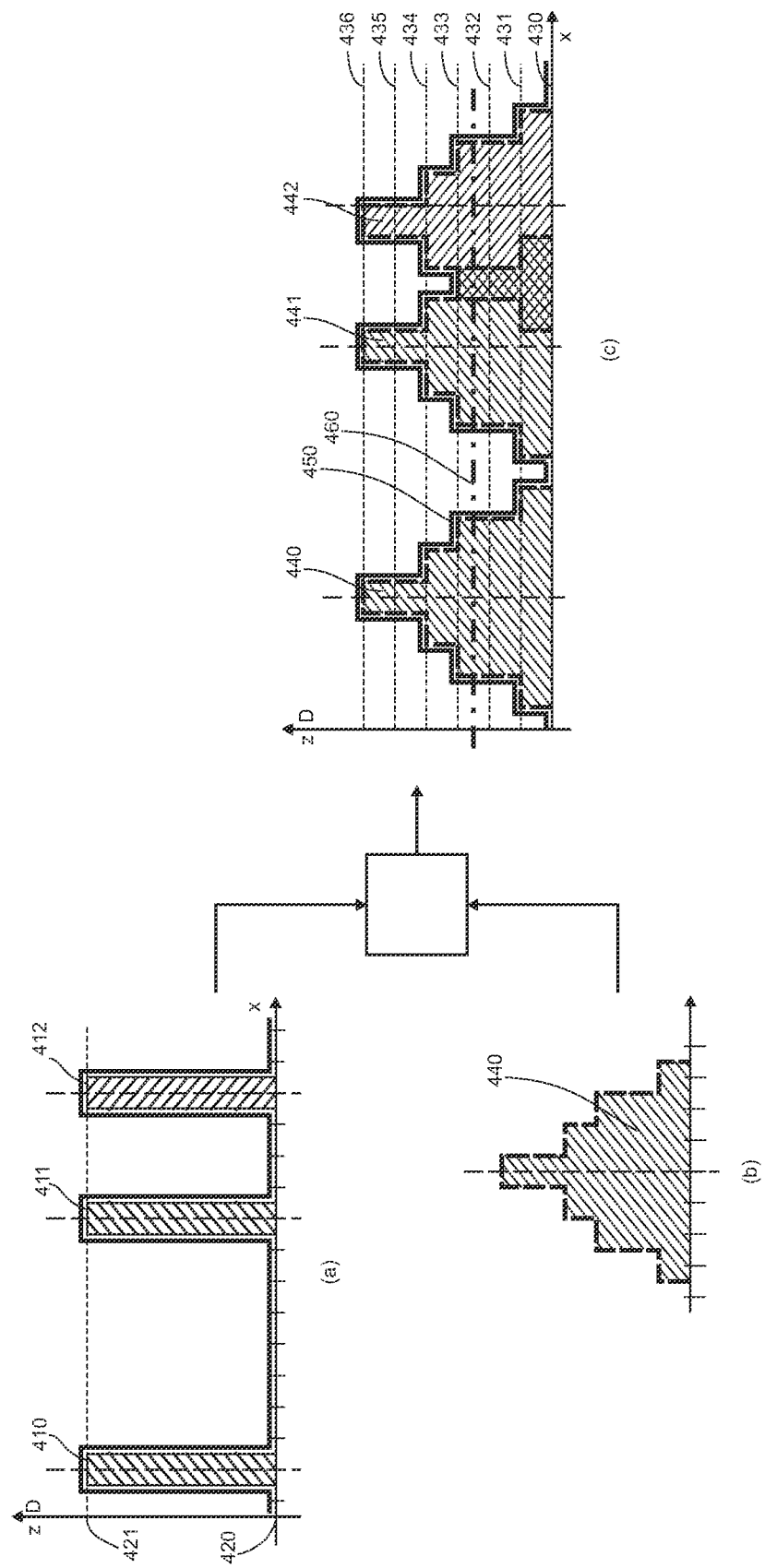
FIG. 4 shows the use of a topographical operator T to create an image of which the density values correspond with the height in a dimension z of a relief print master.

This increasing area can be realized by using a method as disclosed in the European patent application with publication number EP 1 437 882 by Delabastita et al. and which is briefly explained here by means of FIG. 4.

This figure shows a cross section of a digital image whereby the "z" axis indicates the density value of a pixel having a spatial x coordinate.

Part (a) of the figure shows a cross section of a source image, which is a binary halftone image. The image has pixels which can have only two possible density values 420 and 421. In FIG. 4 it is assumed that the higher density value 421 of the pixels 410-412 corresponds with a part of the binary halftone bitmap that prints ink, whereas the lower density value 420 corresponds with a non ink printing part of the binary halftone.

Part (c) of FIG. 4 shows a cross section of the same source image after image processing has been performed on it. In this case the pixels can have seven possible density values 430-436.

A first step according to the method in the above reference patent consists of individually convolving every binary pixel 410-412 with a density profile 440 such as the one depicted in part (b) of FIG. 4. Such a density profile 440 has the property that its density D is the highest near its spatial center and that it tapers off for increasing spatial distance from its center. In the example of part (b) of FIG. 4, the density profile has seven density levels.

In part (c) of FIG. 4, the contours of the individually convolved pixels with the density profile 440 are drawn with line segments.

A second step consists of taking the union (or the envelope in the z-dimension) of all the individually convolved pixels. In part (c) of FIG. 4, the convolved pixels 441 and 442, for example, overlap and their union (or envelop) is taken. The result of this union is indicated in part (c) of FIG. 4 with the thick solid line 450.

The image that results from the second step can be interpreted as a "relief map" whereby the density values of the processed image correspond with the height in the z-dimension of a relief print master.

The intermediate layers 210 (FIG. 2) of such a relief map can hence be obtained by "digitally slicing" the relief map with planes parallel to the x-y dimensions.

For example, a specific intermediate layer 210 corresponds with a slice 460 in part (c) of FIG. 4, which is obtained by selecting the pixels in the relief map of which the density value is in between a lower value 432 and an upper value 433.

The design and the selection of the density profile 440 provides control over the slope 235 (FIG. 2) of the features of the relief print master. For example, it is possible that the slope 235 varies along the z dimension, or that it is made dependent of the size of the features whereby small features may have a smaller slope than larger features. In the latter case a density profile 440 with a different design would be selected for the small image features compared to large image features.

The selection of the density profile also enables to create the "mesa relief" 212 that is shown in FIG. 2.

Relief Print Master Reconstruction (first preferred embodiment, cfr. FIG. 5, FIG. 6, FIG. 8 and FIG. 9)

When the apparatus shown in FIG. 5 is used, the print master can be created by sequentially printing the intermediate layers 210, 211 and 212.

Figure 8:
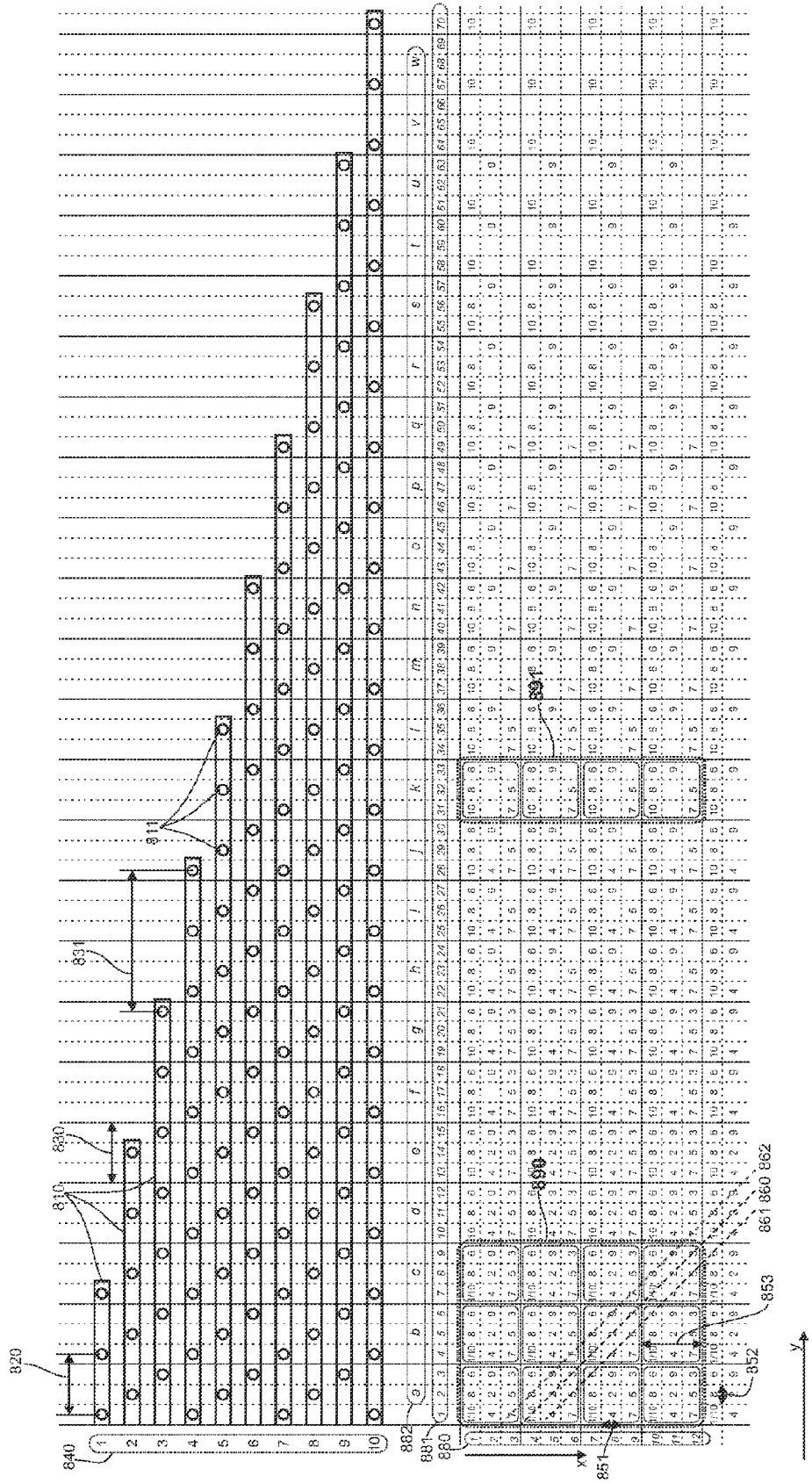
FIG. 8 shows how a single layer of a relief print master is built up by repeating a sequence of printing a swath of pixels, followed by shifting the printhead in a slow scan dimension.
Figure 9:
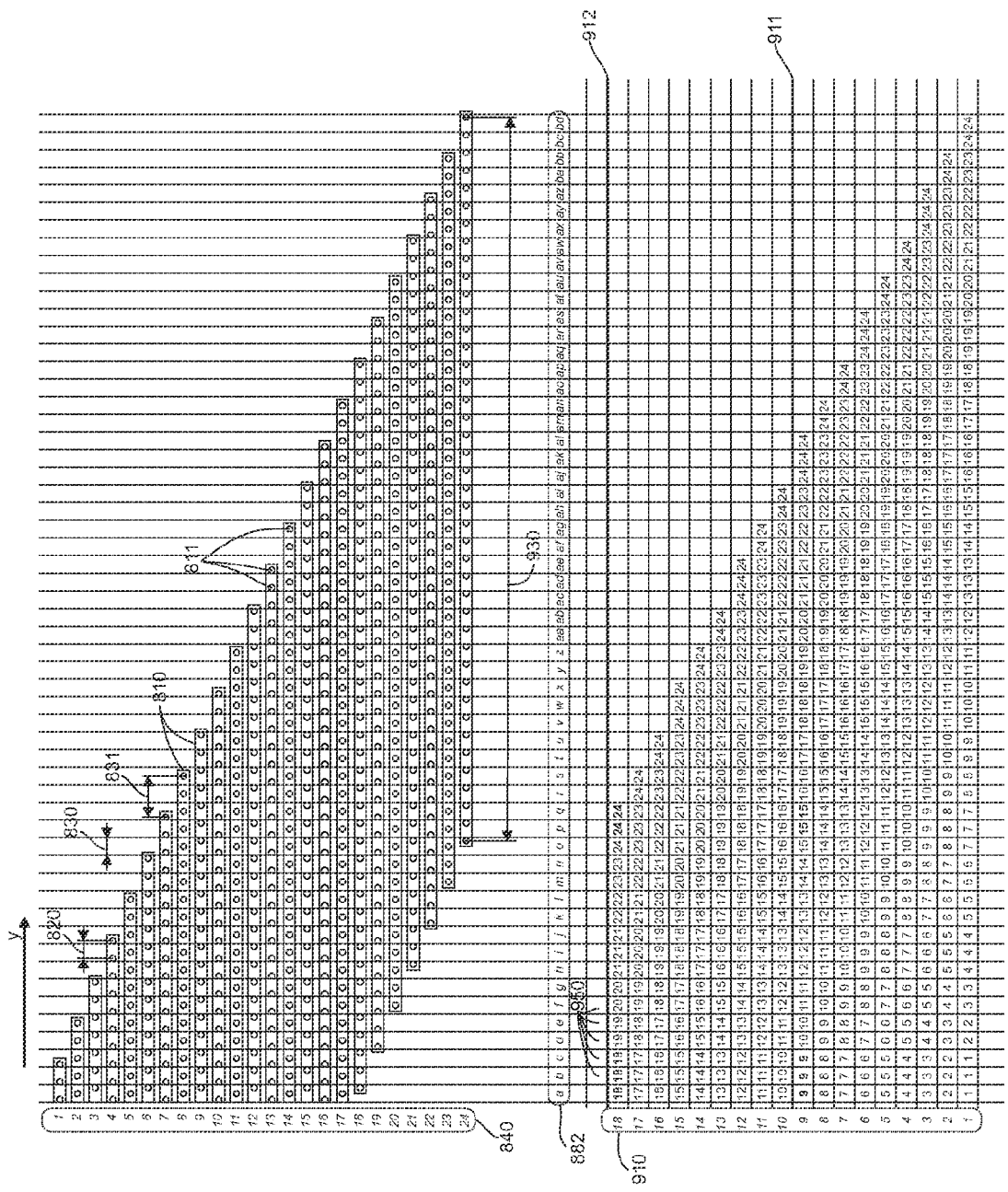
FIG. 9 corresponds with FIG. 8 but shows how multiple layers are built on top of each other for creating a print master.

A sequence of printing steps to reconstruct a relief print master according to a preferred embodiment of the current invention can be explained by means of FIG. 8 and FIG. 9 (the latter being a condensed version of FIG. 8 so that a greater range in the slow scan dimension y can be depicted).

The upper part of these two figures shows a sequence of various positions 840 of a printhead 810 along a slow scan dimension y with regard to the support layer (520 in FIG. 5). The position having an index value "1" corresponds with the initial position of a printhead 810. The distance between two subsequent positions of the printhead along the slow scan dimension y corresponds with a fixed step and is called "SlowScanPitch".

In FIG. 8 only the positions 840 indexed from 1 to 10 are shown, whereas in FIG. 9 (the condensed version of FIG. 8) the positions range from 1 to 24. In a practical situation the printhead continues to move until the head arrives in an end position (which is not shown on either of the figures).

A "print cycle" corresponds with a complete set of steps for moving a printhead from its initial to its end position.

The printhead 810 has nozzles 811. The distance between two neighboring nozzles is the nozzle pitch 820 ("NozzlePitch"). The value of the variable NozzlePitch is usually dictated by technical constraints related to printhead construction.

At each one of its positions 840, the printhead moves relatively to the support layer (520 in FIG. 5) in a fast scan dimension x for printing a swath of pixels. The direction of the arrow representing the fast scan dimension x in FIG. 8 corresponds with the direction of the printhead movement relative to the support layer. The distance 853 in the fast scan dimension between two pixel marking positions that are printed during the same swath is called "fMarkPitch".

The value of fMarkPitch is related with the velocity of the printhead in the fast scan dimension ("FastScanVelocity") and the firing frequency for ejecting ink droplets by the printhead ("FiringFrequency"). Specifically:

$$fMarkPitch = FastScanVelocity / FiringFrequency$$

In a practical situation, the value of FiringFrequency is usually dictated by technical constraints related to printhead construction. It is preferably selected to the highest possible value that guarantees reliable ink jetting by the printhead because this maximizes printhead performance.

Because in FIG. 8 the value of SlowScanPitch is 2+⅓ times the value of NozzlePitch (instead of simply being a multiple of NozzlePitch), the distance 852 (called "sPixelPitch") between two neighboring columns 881 of marked pixels measured along the slow scan dimension y is ⅓ of the value of NozzlePitch. The result of this effect is that the print resolution in the slow scan dimension is increased by a factor of 3.

In general, the ratio of NozzlePitch divided by sPixelPitch is called "InterlacingFactor" and refers to the increase of the printing resolution in the slow scan dimension y that results from selecting a particular value of SlowScanPitch. Specifically:

$$InterlacingFactor = NozzlePitch / sPixelPitch$$

In a practical situation the value of sPixelPitch is dictated by image quality requirements.

An additional effect of the selection of the value for the variable SlowScanPitch is that neighboring pixels that have the same row index number 880 are marked by different sets of nozzles of the printhead. This second effect spatially diffuses nozzle correlated image quality artifacts along the slow scan dimension. A higher value of the variable InterlacingFactor results in spatial diffusion over more sets of nozzles and less nozzle correlated image quality artifacts.

In FIG. 8, the timing for marking pixels in the fast scan dimension is shifted by ⅓ or ⅔ of a period when subsequent swaths are printed. A first effect of this is that pixels are printed along the fast scan dimension at a distance 851, called "fPixelPitch" that is ⅓ of the value of fMarkPitch. As a result, in FIG. 8 the value of fPixelPitch is exactly ⅓ of the value of fMarkPitch or, in other words, the printing resolution in the fast scan dimension is increased by a factor of 3.

In general, the ratio of fMarkPitch divided by fPixelPitch is called "ShinglingFactor" and refers to the increase of printing resolution in the fast scan dimension y that results from shifting the timing for marking pixels between the printing of subsequent swaths. Specifically:

$$ShinglingFactor = fMarkPitch / fPixelPitch$$

A second effect of shifting the timing for marking positions in the fast scan dimension when subsequent swaths are printed is that pixels that have the same column index number 881 are marked by different sets of nozzles of the printhead. This second effect spatially diffuses nozzle correlated image quality artifacts along the fast scan dimension. A higher value of the variable ShinglingFactor results in spatial diffusion over more different nozzle sets and less nozzle correlated image quality artifacts.

In a practical case, a value for ShinglingFactor is selected that sufficiently diffuses nozzle correlated image quality artifacts, whereas the value of fPixelPitch is dictated by image quality requirements. As a result the value of the variable FastScanVelocity is dependent on the values of FiringFrequency, ShinglingFactor and fPixelPitch. Specifically:

$$FastScanVelocity = fPixelPitch * ShinglingFactor * FiringFrequency$$

As mentioned already, the values of sPixelPitch and fPixelPitch are dictated by image quality requirements such as the clean rendition of text and halftones.

For example, high quality rendering of text requires a value of both sPixelPitch and sPixelPitch of 35.25 micron (1"/720) or less.

An important related consideration is that the volume of the ejected ink droplets by the printhead should be selected in relation to the values of sPixelPitch and fPixelPitch in such a way that the filling of a raster of neighboring printed ink droplets results in a consistent, isotropic and even printed ink layer. If the volume of the droplets is too low, neighboring ink droplets will not connect between each other on the printed surface, resulting in reduced consistency and strength of the printed layer. If the volume is too high, neighboring ink droplets will overlap on the printed surface, resulting in reduced evenness of the printed layer. So the volume of the ejected droplets, together with the physical properties of the ink, should be selected to offer a good compromise between these conflicting constraints.

If the above conditions are met, a droplet having a specific volume creates a mark having a specific area and thickness. In the above example, the area corresponds with the area of an equivalent "square" pixel area of 35.25 micron by 35.25 micron. If a printhead is used that ejects droplets having a volume of 7 picoliter, the average thickness of a layer that is printed by such a printhead will be $(7.0E\text{-}15\ m^3)/(35.25E\text{-}6\ m)*35.25E\text{-}6\ m) = (5.6E\text{-}6\ m)$ or 5.6 micron.

Referring to FIG. 8, a group of ShinglingFactor times InterlacingFactor pixels defines a repeating parcel 890 of 9 markable pixels. In each such a parcel only one pixel is marked during a single pass of a printhead in the fast scan dimension. Correspondingly it also takes ShinglingFactor*InterlacingFactor passes of the printhead (in the fast scan dimension) to print all the pixels in a parcel 890.

In between the passes, the printhead moves over a distance SlowScanPitch 831. As a result of this, every pixel within a single parcel is printed by a different nozzle of the printhead and image quality artifacts that are correlated with individual nozzles are diffused over the area of a parcel 890. This printing method is hence effective for suppressing banding and streaking artifacts that correlated with individual nozzle variation.

The particular selection of the fractional part of the value of SlowScanPitch in FIG. 8 to ⅓ dictates that every next pass in the fast scan dimension a column of pixels is marked that lies next right to the column of pixels marked in a previous pass. For example, the pixel that is printed when the printhead is in a position "5" in a parcel 890, is in a column next right to the column of a pixel that is printed in a position "4" of the same printhead. So the selection of a particular value for the variable SlowScanPitch not only affects the value of the InterlacingFactor, but also the order of columns in which pixels are marked within a parcel. If for example, a value of ⅔ would have been selected for the fractional part of the value of SlowScanPitch, the value of the variable InterlacingFactor would have been the same, but every next pass in the fast scan dimension would mark a pixel in a column that lays second next right to the column of pixels marked in a previous pass.

Similarly, a particular selection for shifting the timing for marking positions in the fast scan dimension by ⅓ or ⅔ of a period when subsequent swaths are printed dictates the order in which pixels are marked in the rows of a parcel. If, for example, in FIG. 8 the phase for marking pixels during a position 1 of the printhead is taken as a reference, the pixels that are marked during position 7 of the printhead are delayed by ⅔ of a period, whereas the pixels that are marked during position 8 of the printhead are not delayed with regard to the reference phase.

In summary, the selection of the fractional part of the value of SlowScanPitch and of the phase shifting for marking pixels during subsequent passes determines an ordering scheme for marking the InterlacingFactor*ShinglingFactor pixels within a parcel 890. The same ordering scheme is consequently used for filling up parcels in subsequent layers. FIG. 10 shows a specific example of an ordering scheme that is further on used in the explanation.

In a practical case, a preferred marking order will dictate the selection of the fractional part of the value of SlowScanPitch and the phase shifting for marking pixels during subsequent passes—and not vice versa. Referring to FIG. 8 again, the marking order has been selected such that pixels that are marked for subsequent printhead positions 1, 2 and 3 form a diagonal line 860, for subsequent positions 4, 5 and 6 a diagonal line 861 and for subsequent positions 7, 8 and 9 a diagonal line 862.

The advantage of this approach is that ink resulting from printing these diagonal lines forms a solid "wall" when it is partially cured that reduces ink bleeding when subsequently the spaces between these lines receive ink.

When the printhead leaves the position (840) 9 in FIG. 8, it will have marked all the pixels having column indices 881 from 1 to 9. At that point, all the pixels in the parcels 890 of a first intermediate layer have been reconstructed by the printer. The parcels on the right hand side of the parcels 890 have not or only partially been reconstructed. For example, in the parcels 891 only the pixels corresponding with the print head positions 6, 7, 8 and 9 have been marked. The remaining pixels (including pixels marked with 10) have yet to be marked in subsequent positions of the printhead.

At a next position 10 of the printhead, columns 1, 4 and 7 receive a first mark "10" of a second intermediate layer at exactly the same position as the first mark "1" of the first intermediate layer.

To explain in more detail how the second and next intermediate layers are further reconstructed, FIG. 9 has been drawn.

In this figure, all the pixels that belong to a specific column of parcels 882 in FIG. 8 or FIG. 9 are drawn vertically accumulated in columns 950 to save space in the y dimension of the drawing and so that many more head positions 840 can be represented. The different columns are indexed by means of an index character word 882 ranging from "a" to "bd" in this drawing. Each index character word corresponds hence with a column of parcels consisting of 3*3 pixels.

Just as in FIG. 8, the numbers in the columns 950 indicate the printhead position 840 during which a pixel is marked. A pixel that is marked at an earlier position of the printhead has a lower position (and a lower index number 910) in a column 950.

Because each parcel 890 in FIG. 8 contains 9 pixel positions, an intermediate layer for a column of parcels is completely filled up when the printhead leaves a multiple of nine positions in the slow scan dimension. The solid lines 911 and 912 in FIG. 9 indicate the boundaries between pixels of two fully finished adjacent intermediate layers.

For example, a first intermediate layer for the parcels corresponding with index numbers "a", "b" and "c" are finished after the printhead leaves its ninth position. This is indicated by the solid line 911. A first pixel of a second intermediate layer corresponding to the same parcels is marked when the printhead is in a position 10. A second intermediate layer for the same parcels is finished when the printhead leaves its eighteenth position. This is indicated by the solid line 912.

Similarly, a first intermediate layer for the parcels having index numbers "o", "p" and "q" is finished after the printhead has been in its fifteenth position and a second intermediate layer of the same parcels is finished when the printhead has been in its twenty fourth position.

FIG. 9 demonstrates that, according to a preferred embodiment of the current invention, multiple intermediate layers (210, 211, 212 in FIG. 2) are printed simultaneously during a single print cycle and by the same print head.

For example, when the print head is in a position 23 in FIG. 9, it is reconstructing a lower intermediate layer (below the solid line 911) of the parcels having indices 881 "ah" to "bb", while—at the same time—it is reconstructing an upper intermediate layer (above line 911) of the parcels having indices "m" to "ag".

Referring to FIG. 9, the nine pixels (1 to 9) of a first intermediate layer of the parcels with index value "a" are filled in when the print head is in a position 9. At that point the printhead has made 9 slow scan steps over a total distance of 9*SlowScanPitch.

Since in FIG. 8 and FIG. 9 it was assumed that SlowScanPitch=$(2+⅓)$*NozzlePitch, the total distance traveled by the printhead at that point is: $9*(2+⅓)$*NozzlePitch. This means that the number of effective nozzles (that is, nozzles that are involved to print a complete layer of a set of parcels) involved at that point is equal to:

$$9*(2+⅓)=21$$

Similarly, the nine pixels 10 to 19 of a second intermediate layer of the same parcels are filled in when the print head is in a position 18. At that point the print head has shifted 18 times over a total distance of $18*(2+⅓)$*NozzlePitch. The total number of effective nozzles involved at that point is:

$$18*(2+⅓)=42$$

In general, the printing of an Nth intermediate layer involves an effective number of nozzles ("NbrofEffectiveNozzles") equal to:

$$N*(\text{InterlacingFactor}*\text{ShinglingFactor})*\text{SlowScanPitch}.$$

In a practical situation, the number of intermediate layers is not a design parameter. The fact that the different intermediate layers that are being printed simultaneously by a printhead have different distances between the head and the printed surface implicates a practical limitation on the total thickness of a set of intermediate layers that can be printed in one print cycle. If the total thickness of a set of intermediate layers exceeds the thickness of relief printmaster that is to be reconstructed, multiple print cycles are required.

The droplets that are ejected by a printhead have a main velocity component in the z direction relative to the substrate. However, since the printhead during printing also moves in the fast scan x dimension, the droplets also have a velocity component in that direction.

This implies that the landing position in the fast scan x direction is affected by the distance between the printhead and the printable substrate. Because printing an additional layer changes this distance, the landing position of droplets in the x dimension is trailing for lower printed layers compared to a higher printed layer. This trailing causes geometrical distortions that have to be limited by limiting the number of intermediate layers that are simultaneously being printed.

In a previous example it was already explained that a specific printhead that has a droplet volume of 7 picoliter and that is used for printing pixels having a square size of 35.25 micron results in a individual layer thickness of 5.6 micron. If the application demands that a total thickness for the above reasons should be limited to for example 200 micron, the maximum number of intermediate layers is calculated as:

$$(200 \text{ micron})/(5.6 \text{ micron/layer})=35.71 \text{ layers}$$

Rounding up the number of layers to an integer value yields 36 layers.

Assuming that a specific printhead has for example 764 available nozzles, the above formula enables to obtain a first, approximate value for the value of SlowScanPitch:
NbrNozzles=764;
InterLacingFactor=ShinglingFactor=3;
N=36;

$$\text{SlowScanPitch}<=764/(3*3)/36=2.17$$

Since it was determined at an earlier design stage that for reasons of the marking order SlowScanPitch should have a fractional part equal to ⅓, the value for the SlowScanPitch that is selected equals 2+⅓, which is the nearest available value to 2.17 that satisfies this requirement. This enables to calculate the number of effective nozzles as:

$$\text{NbrofEffectiveNozzles}=36*(3*3)*(2+⅓)=756$$

That means that in this case 8 nozzles are unused during the print master reconstruction.

Relief Print Master Reconstruction (Second, Preferred Embodiment, cfr. FIG. 7, FIG. 13A to FIG. 13J)

Most of the principles that were explained for reconstructing a print master on the equipment shown in FIG. 5 or FIG. 6 can also be used for reconstructing a print master on the equipment shown in FIG. 7. However, the reconstruction of a seamless print master on the equipment in FIG. 7 imposes a few additional constraints. These additional constraints follow from the fact that the printhead in this case does not move in discrete steps in the slow scan dimension y as with the equipment shown in FIG. 5 or FIG. 6, but rather in a continuous fashion, that is as a linear function of angular phase of the rotating drum. Additionally, it is expected that the cadence of the printing marks should not change during subsequent revolutions of the drum.

FIG. 13A to FIG. 13J show a set of flat projections of a part of the surface area of the flexographic relief printed on the support layer 720 shown in FIG. 7 while it is being reconstructed.

For practical reasons, not the whole surface area is shown, but only the part near the date line 1301.

The role of the date line 1301 in the following explanation could be compared with the role of the international date line which serves to divide the globe into zones having different dates. In this particular case the date line is used to distinguish between pixels marked during different revolutions of the drum. In general a date line can be selected that crosses any position along the circumference of the sleeve since nothing special or "discontinuous" occurs at such a date line during the reconstruction of a print master. In the specific example shown in FIG. 13A to 13J, the date line was selected so that it coincides with the marking of the very first pixels (marked with "1") on the printed surface.

The reference sign 1302 corresponds with the printhead and the reference sign 1303 with a slow scan dimension y for moving the printhead parallel with the axle of the drum.

The reference sign 1300 refers to the length of the circumference of the sleeve, which is a parameter having a value "Circumference". The value of this parameter is usually fixed. It is for example dictated by market requirements that specify a diameter of the sleeve on which the print master is to be created.

The drum revolves at a revolving speed having a value of "NbrRevsperTimeUnit". The value of NbrRevsperTimeUnit is a design variable. The linear speed of an arbitrary point on the surface of the drum has a value "FastScanVelocity". The above variables are related as follows:

$$FastScanVelocity = Circumference * NbrRevsperTimeUnit.$$

Printhead 1302 has nozzles 1304. The distance 1305 between two neighboring nozzles is represented by the parameter "NozzlePitch". The value of this parameter is determined by the same technical constraints as in the previous preferred embodiment.

The printhead can print marks at a frequency having a value "FiringFrequency". The range of values for the parameter FiringFrequency is dictated by the same technical constraints as in the previous preferred embodiment.

Figure 13A:
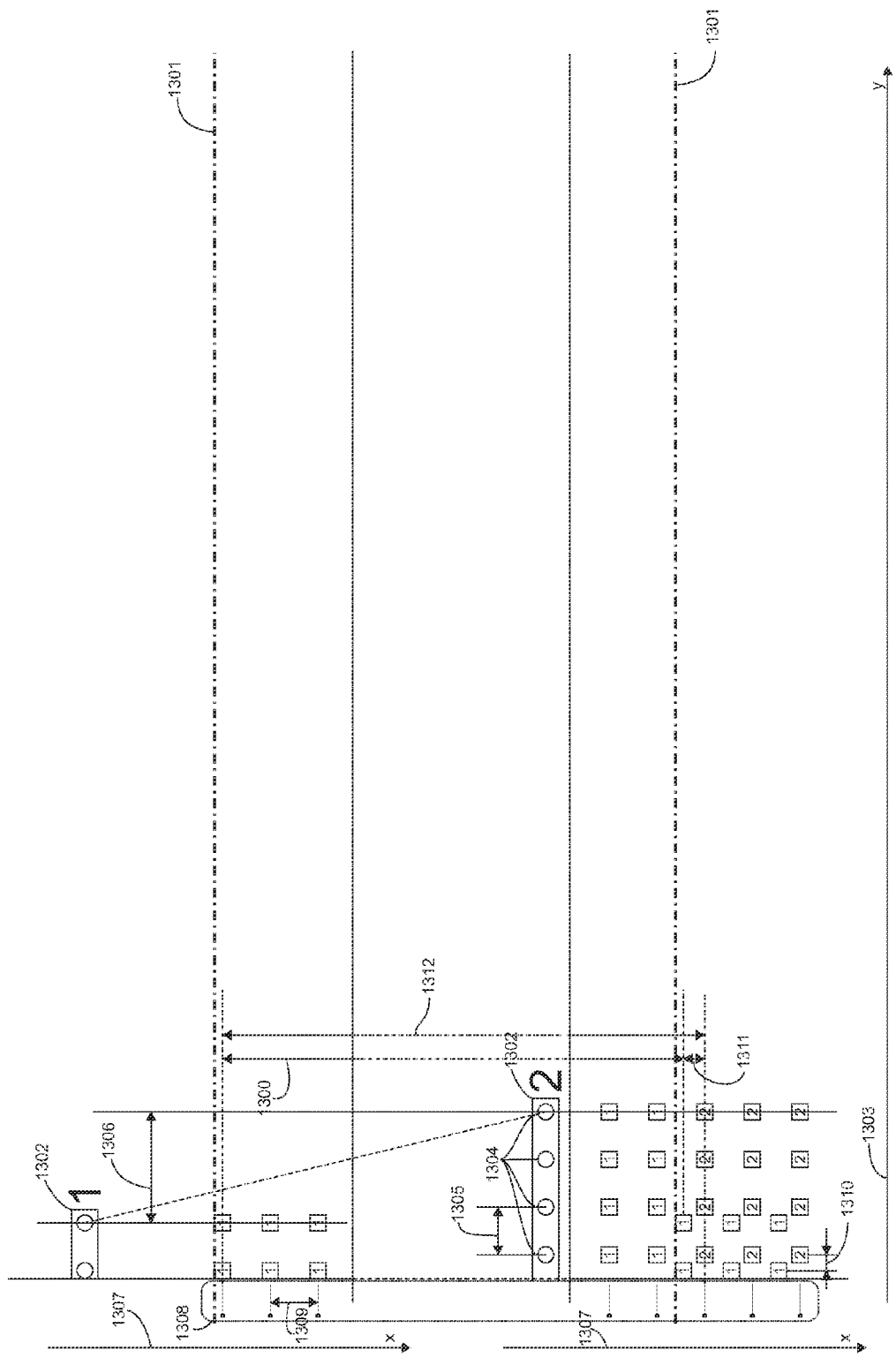
FIG. 13A to 13J teach the reconstruction of a seamless flexographic print master according to a preferred embodiment of the current invention during subsequent revolutions.

The "tick marks" 1308 in FIG. 13A indicate at which rotational positions on the circumference of the sleeve pixels can be marked during a specific revolution of the drum.

As the drum rotates, the printhead moves in a continuous motion in the slow scan dimension y. The distance "SlowScanPitch" is indicated by the reference sign 1306 in FIG. 13A to FIG. 13J and corresponds with the movement of the printhead in the slow scan dimension for exactly one revolution of the drum. The value of SlowScanPitch is a design variable. In the example shown in FIG. 13A to FIG. 13J, the value of SlowScanPitch is equal to (2+⅓) times the value of NozzlePitch. The rational behind this selection is similar to what was explained for the selection of the variable SlowScanPitch in the previous preferred embodiment.

While the sleeve revolves, every individual nozzle 1304 of the printhead 1302 describes a spiral line around its surface.

The tangent of this spiral line defines a fast scan dimension that is indicated by reference sign 1307 in FIG. 13A to FIG. 13J.

The fast scan dimension x is strictly speaking not perpendicular to the axle of the printer (or for that matter the slow scan dimension y). Rather it has an angle defined by the expression arctangent(SleeveDiameter/SlowScanPitch) with regard to this axle, in which SleeveDiameter is a parameter representing the outer diameter of the sleeve.

However, since in a typical situation the ratio of SleeveDiameter/SlowScanPitch is very large (for example larger than 1000), this angle approaches 90 degrees very closely. This explains why in FIG. 13A to FIG. 13J the fast scan dimension appears to be perpendicular to the axle of the drum and the slow scan dimension y.

The positions of the printhead 1302 in FIG. 13A to FIG. 13J in the slow scan dimension y are indicated by the large bold numbers (ranging from 1 in FIG. 13A to 11 in FIG. 13J) just right of the printhead. The pixels that are marked by the printhead receive an order number that corresponds with number of the revolution.

In the upper part of FIG. 13A, for example, the position of the printhead near the date line 1301 during the start of a first revolution of the drum is indicated by "1", and a first set of marking elements of the printhead marks a first set of pixels along a fast scan dimension with an order number "1".

This first set of marking elements defines a first printed area that has a width corresponding with the active part of the printhead.

The reference sign 1309 in FIG. 13A refers to the distance variable "fMarkPitch" between two consecutively printed marks in the fast scan dimension x during the same revolution of the drum.

The value of fMarkPitch is related to the value of the parameters Circumference, FiringFrequency and NbrRevsperTimeUnit as follows:

$$fMarkPitch = (Circumference * NbrRevsperTimeUnit)/FiringFrequency$$

Figure 13B:
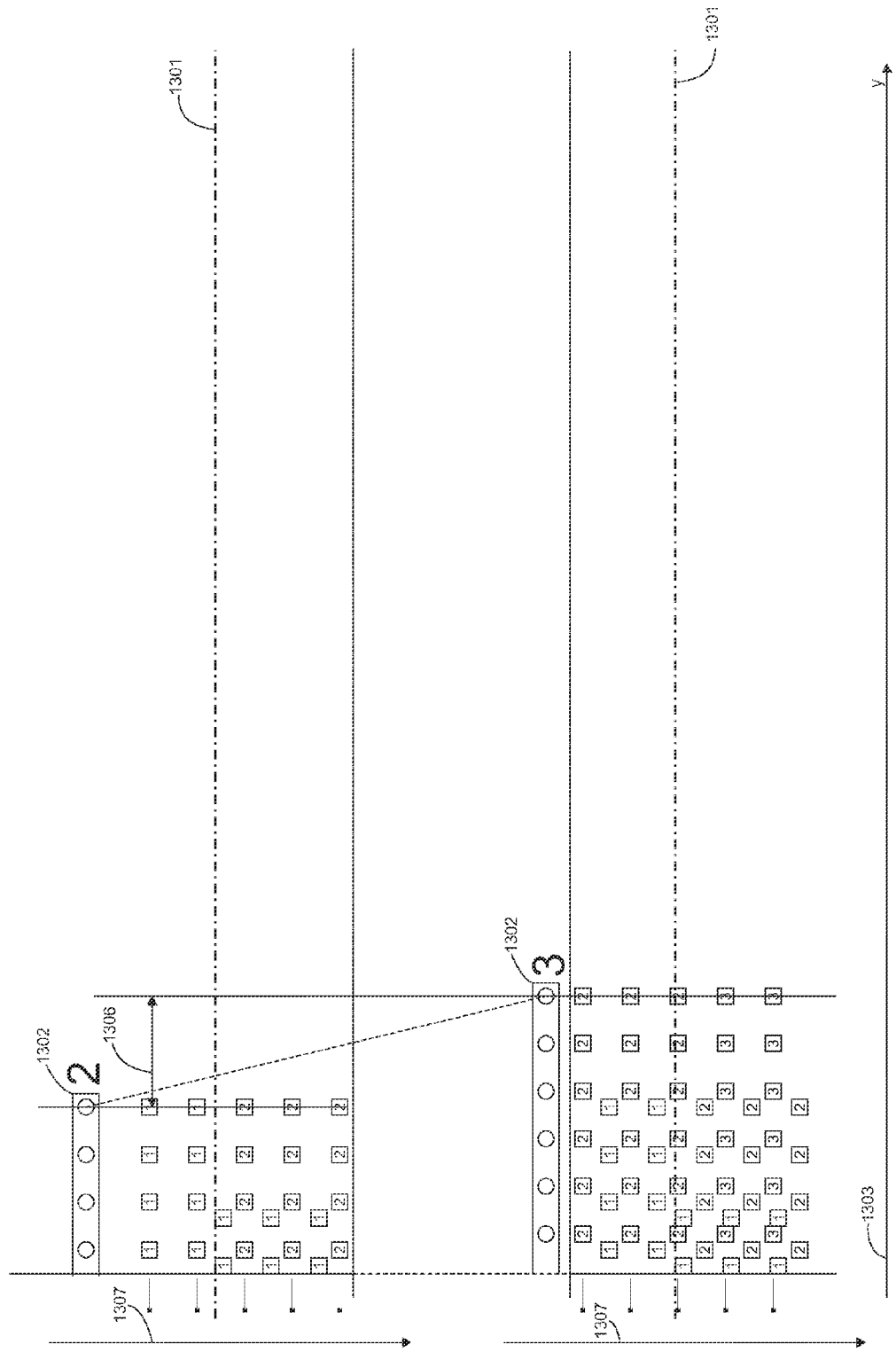
Figure 13C:
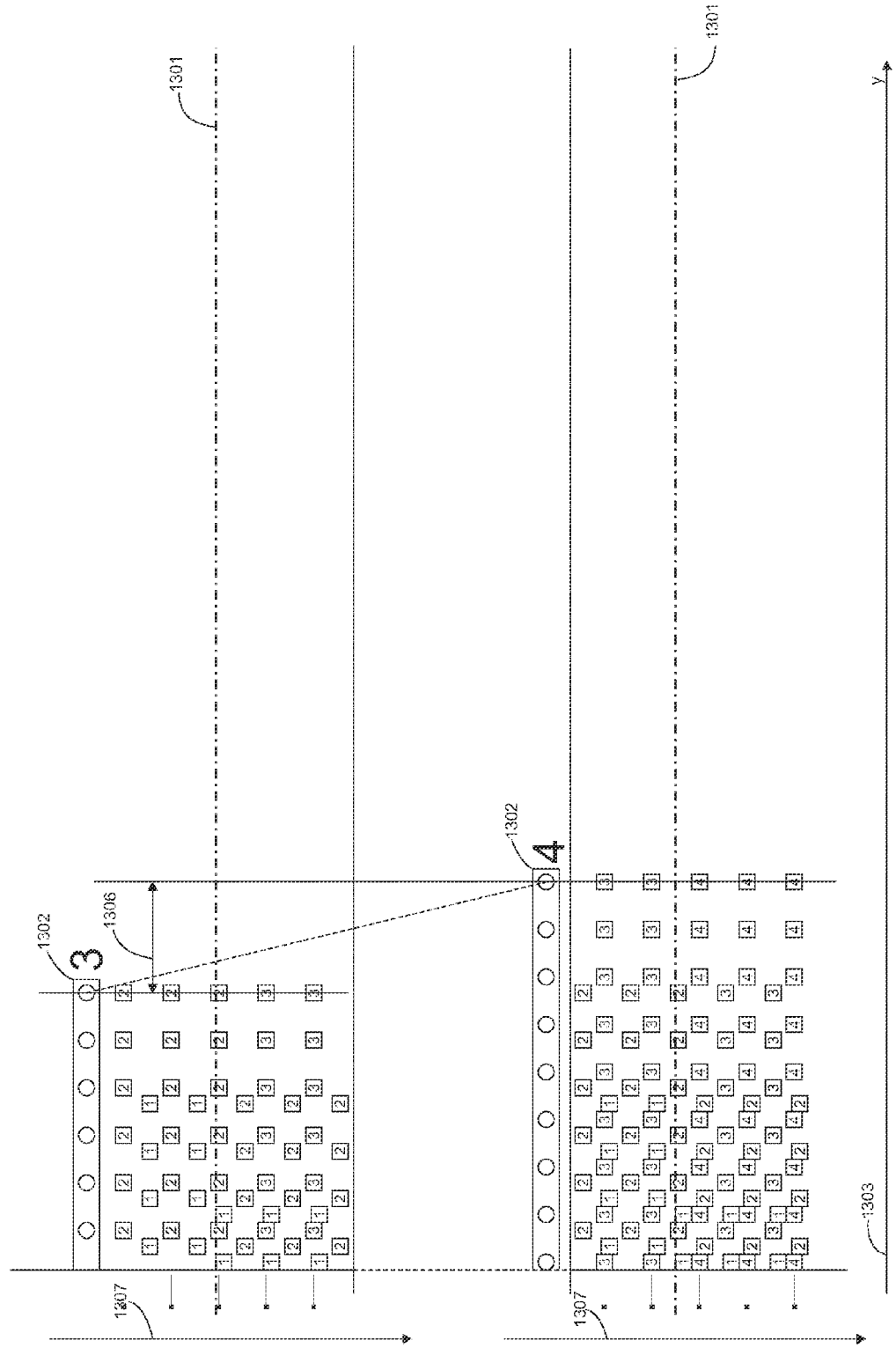

The lower part of FIG. 13A and the upper part of FIG. 13B reflect the situation when the drum has finished a first revolution and is starting a second revolution. The pixels marked with order number 1 were printed during the start of a first revolution with the printhead in a position "1". These pixels of course "remain" marked during second and subsequent revolutions of the drum. The pixels marked with order number 2 are being printed during a second revolution with the printhead starting in a position "2".

These pixels marked with "2" define a second set of pixels along a fast scan dimension marked by a second set of marking elements. These marking elements also define a second printed area that has a width corresponding with the active part of the printhead and that partially overlaps with the first area.

The difference between the width of the first area and the second area corresponds with the SlowScanPitch.

Because the value of the variable SlowScanPitch was selected so that it is equal to (2+⅓) times the NozzlePitch, pixels with order number 2 are marked during a second revolution next right to pixels with order number 1 at a distance (reference number 1310) which is equal to (⅓)*NozzlePitch in the slow scan dimension y. This distance defines the value of a variable "sPixelPitch". The ratio of NozzlePitch/sPixelPitch defines the value of a variable "InterlacingFactor".

The value of InterlacingFactor corresponds with the increase of the printing resolution in the slow scan dimension that results from selecting a particular value of SlowScanPitch in relation to the value of the variable NozzlePitch. In the example shown in FIG. 13A to FIG. 13J, the value of InterlacingFactor is equal to 3.

In general, the selection of a value for the variable InterlacingFactor is based on the same arguments as in the previous preferred embodiment.

Similarly a variable "ShinglingFactor" can be defined for increasing the resolution in the fast scan dimension. The variable ShinglingFactor determines how many additional pixels are marked between two pixels that are subsequently marked in the fast scan dimension during a single revolution. The selection of the variable ShinglingFactor hence defines a variable "fPixelPitch" that corresponds with the distance in the fast scan dimension between two neighboring pixels. Specifically:

$$fPixelPitch = fMarkPitch/ShinglingFactor$$

In general, the selection of a value for the variable ShinglingFactor is based on the same arguments as in the previous preferred embodiment.

In the example of FIG. 13A to FIG. 13J a value of ShinglingFactor was selected that is equal to the value of InterlacingFactor. Specifically:

$$ShinglingFactor = InterlacingFactor = 3.$$

In general, the selection of a value for the variable NbrRevsperTimeUnit is based on the similar arguments as the calculation of the value for the variable FastScanVelocity in the previous preferred embodiment. Specifically:

$$NbrRevsperTimeUnit = fPixelPitch * ShinglingFactor * FiringFrequency/Circumference$$

In the preferred embodiment shown in FIG. 13A to FIG. 13J, a value of variable fMarkPitch was selected so that it meets the following additional constraint in which N is an integer number:

$$N * fMarkPitch = Circumference + fMarkPitch * (4/9)$$

The distance N*fMarkPitch is indicated by the reference sign 1312 in FIG. 13A.

This particular selection of fMarkPitch has the effect that in FIG. 13A a pixel marked "2" during the second revolution has a position that is fMarkPitch*(4/9) lower (indicated by reference sign 1311) in the fast scan orientation x than the position of a pixel marked "1" which was marked during the first revolution.

Similarly, a pixel that is marked "3" during a third revolution has a position that is fMarkPitch*(4/9) lower in the fast scan dimension than a pixel marked "2" during a second revolution of the drum. This phase shift accumulates with the phase shift that was introduced during the second revolution so that the total phase shift with regard to the pixels marked with 1 is equal to fMarkPitch*(8/9).

This phase shift of fMarkPitch*(4/9) in the fast scan dimension between pixels marked during a previous and a subsequent revolution repeats itself and the total phase shift continues to accumulate as FIG. 13A to FIG. 13J demonstrate.

During the fourth revolution (lower part of FIG. 13C) the accumulated phase shift of pixels marked with 4 compared to pixels marked with 1 equals fMarkPitch*(12/9). Since in this example the ShinglingFactor equals 3, the variable fMarkPitch=3*fPixelPitch. This means that during the fourth revolution pixels are marked that have a position that is exactly fPixelPitch below the position of pixels marked with 1. In plain words: during the fourth revolution, the phase shift in the fast scan dimension has accumulated to a full pixel position.

Also in general, after every subsequent revolution, pixels are marked at positions that are sPixelPitch=NozzlePitch/InterlacingFactor shifted to the right compared to pixels marked during the previous revolution. A consequence of this is that every InterlacingFactor revolutions pixels are marked that are located on the same spiral line. For example, in the lower part of FIG. 13C, the pixels marked "4" during a fourth revolution are printed on the same spiral line as the pixels marked "1" that were printed during a first revolution.

Also in general, after every InterlacingFactor revolutions, pixels are marked at positions that are shifted exactly fPixelPitch=fMarkPitch/ShinglingFactor below pixels that were marked on the same spiral line during a previous revolution.

Figure 13D:
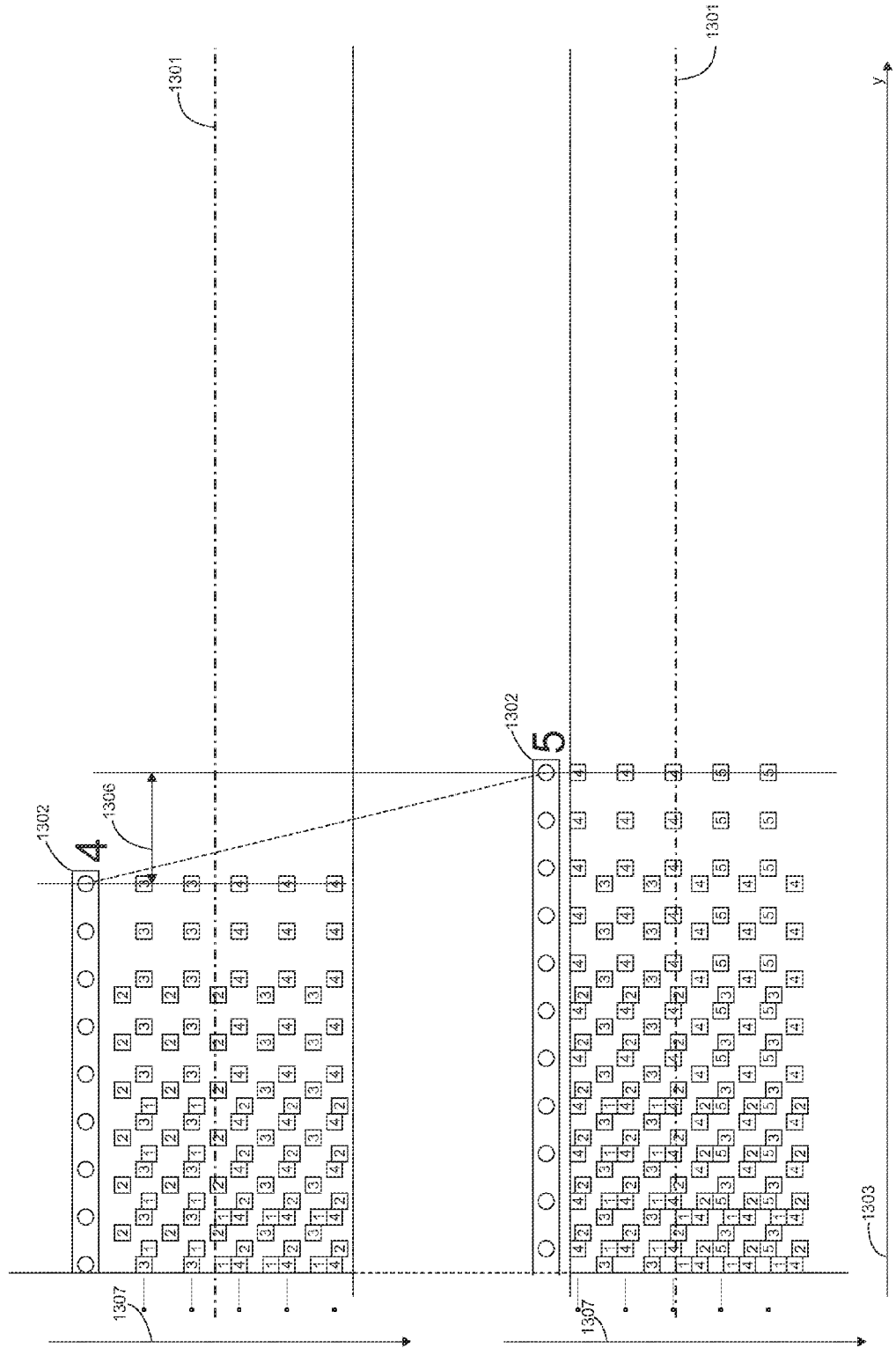
Figure 13E:
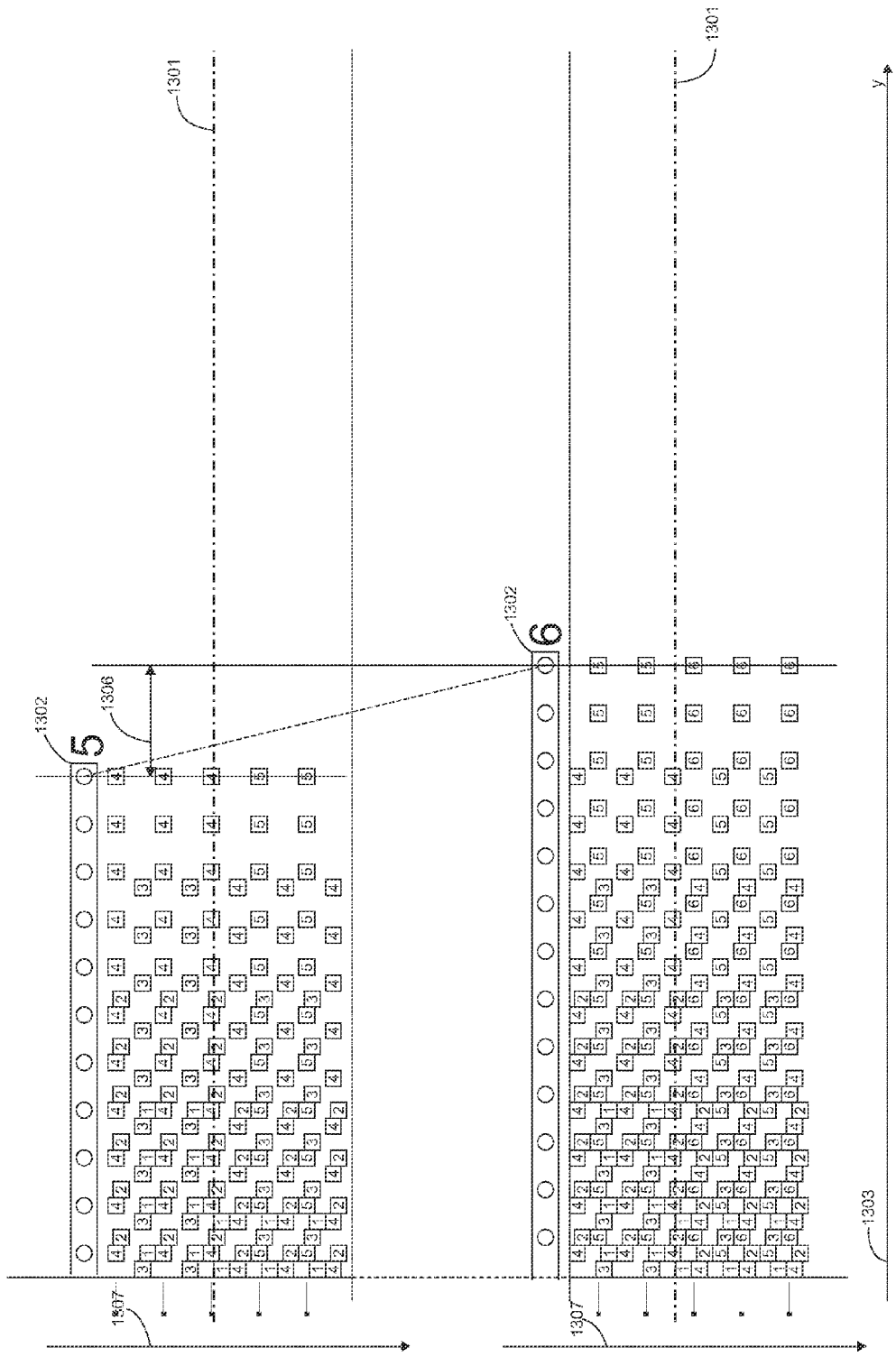
Figure 13F:
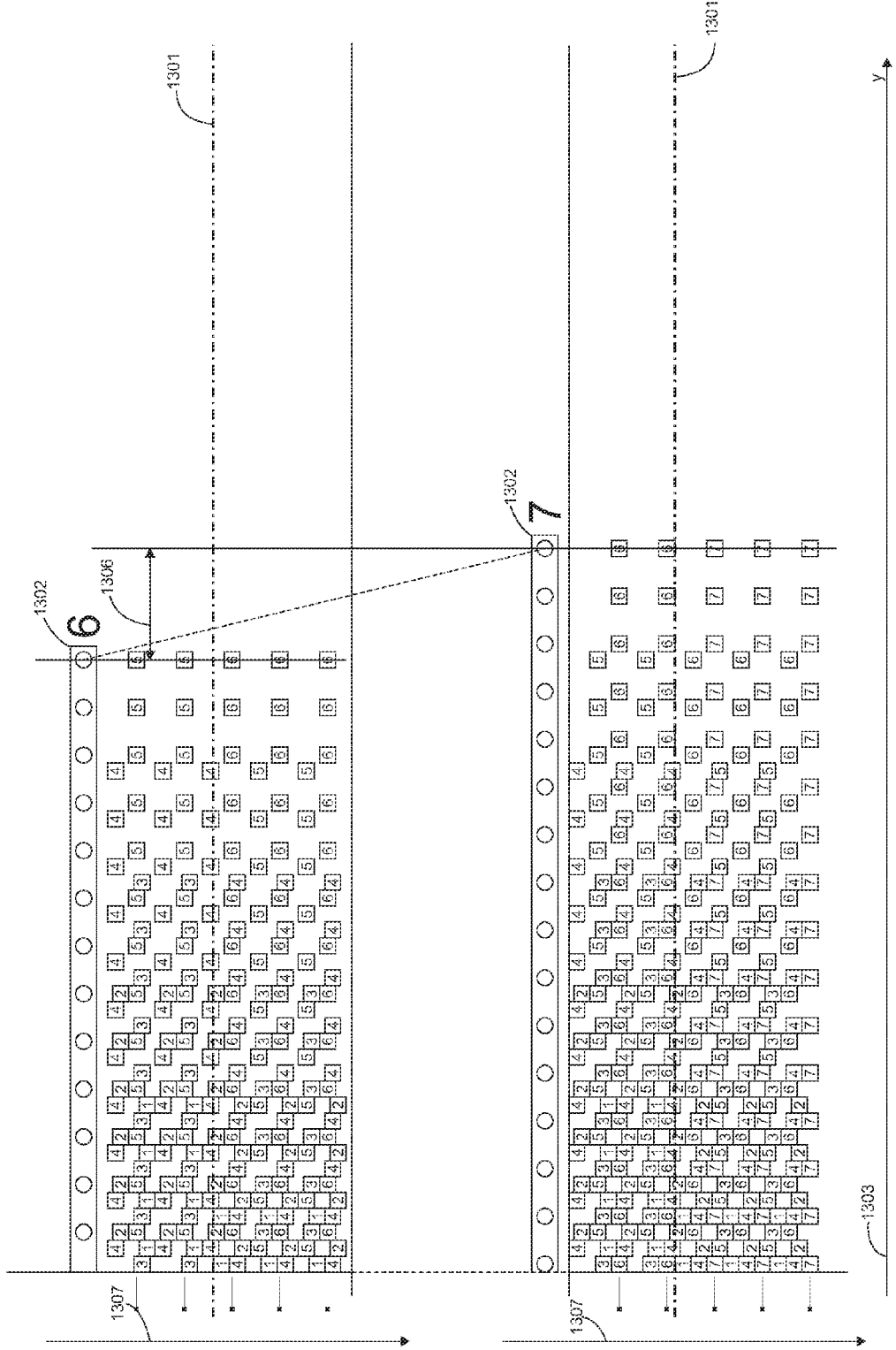
Figure 13G:
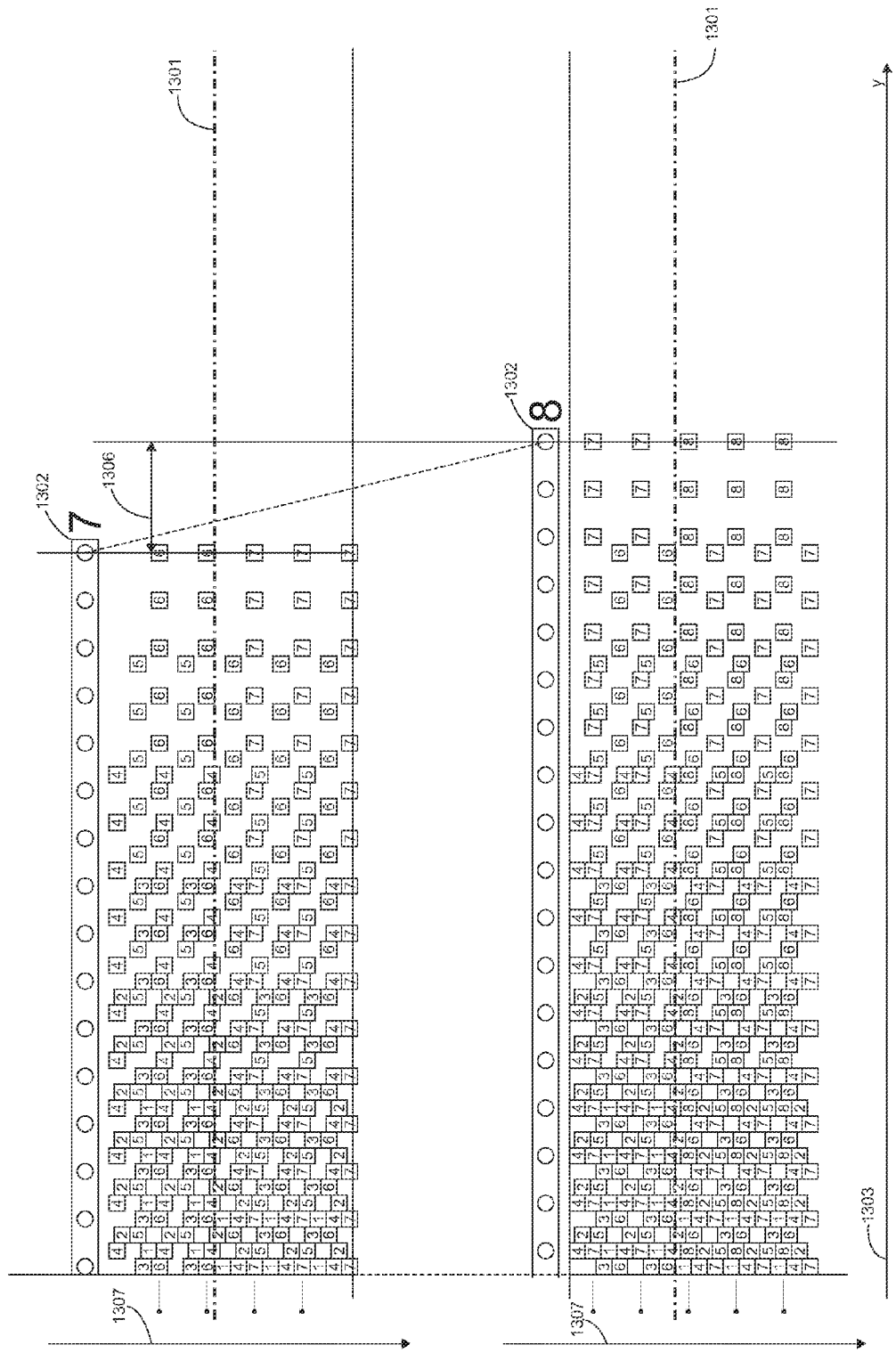

For example, in the lower part of FIG. 13D, the pixels marked with "4" have a position that is exactly fMarkPitch/3 below the pixels marked with "1" on the same spiral line.

The above observations explain the above additional constraint for fMarkPitch. In general, this additional constraint can be formulated as:

$$N*\text{fMarkPitch}=\text{Circumference}+\text{fMarkPitch}*(\text{InterlacingFactor}+1)/(\text{InterlacingFactor}*\text{ShinglingFactor})$$

in which N is an integer number that is preferably selected so that fMarkPitch closely approximates the value of fMarkPitch that is obtained from the formula:

$$\text{fMarkPitch}=\text{fPixelPitch}*\text{ShinglingFactor}$$

This additional constraint for the value of fMarkPitch is easily realized by slightly adjusting the value of either the variable NbrRevsperTimeUnit or FiringFrequency.

Figure 13H:
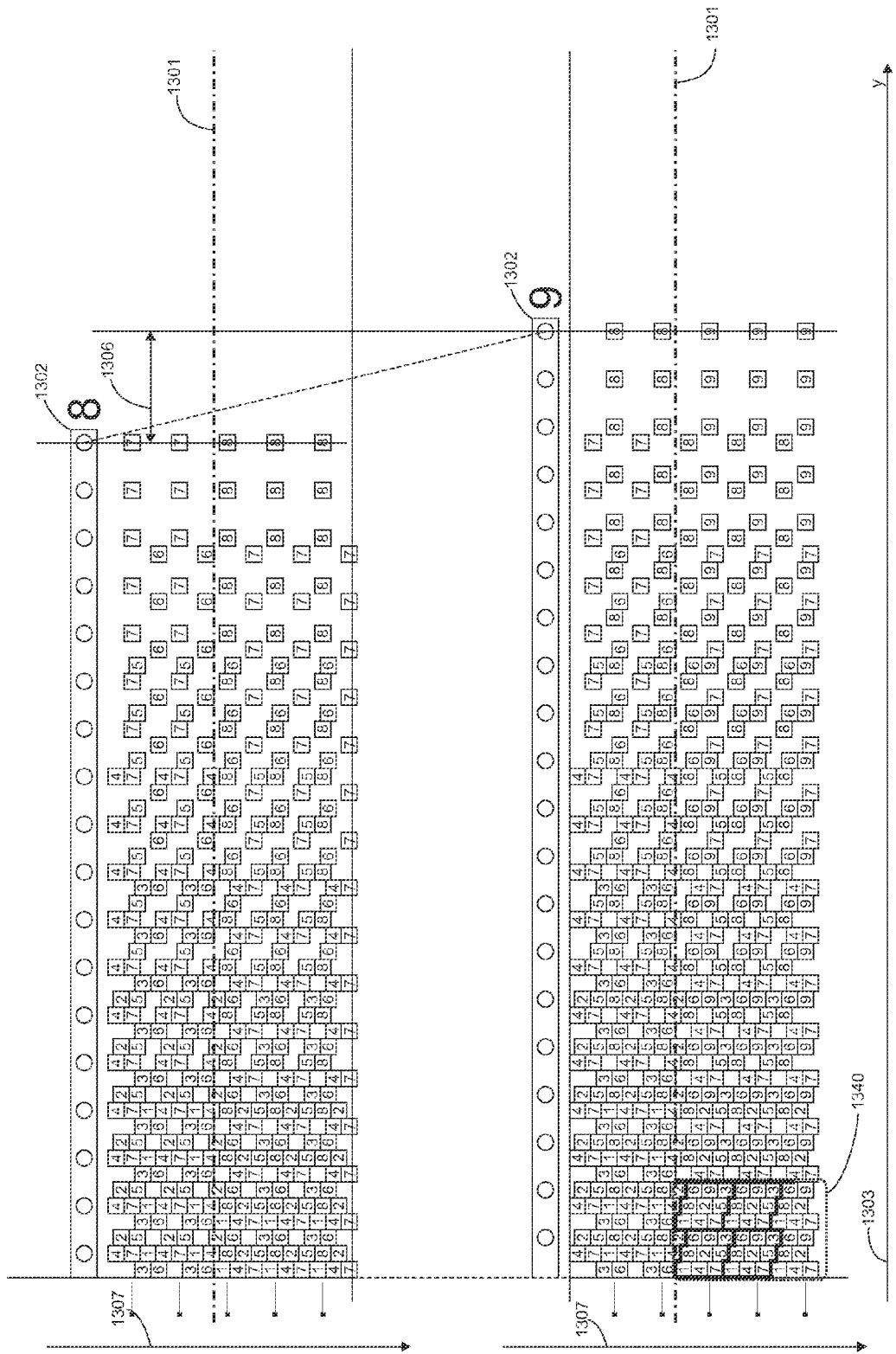
Figure 13I:
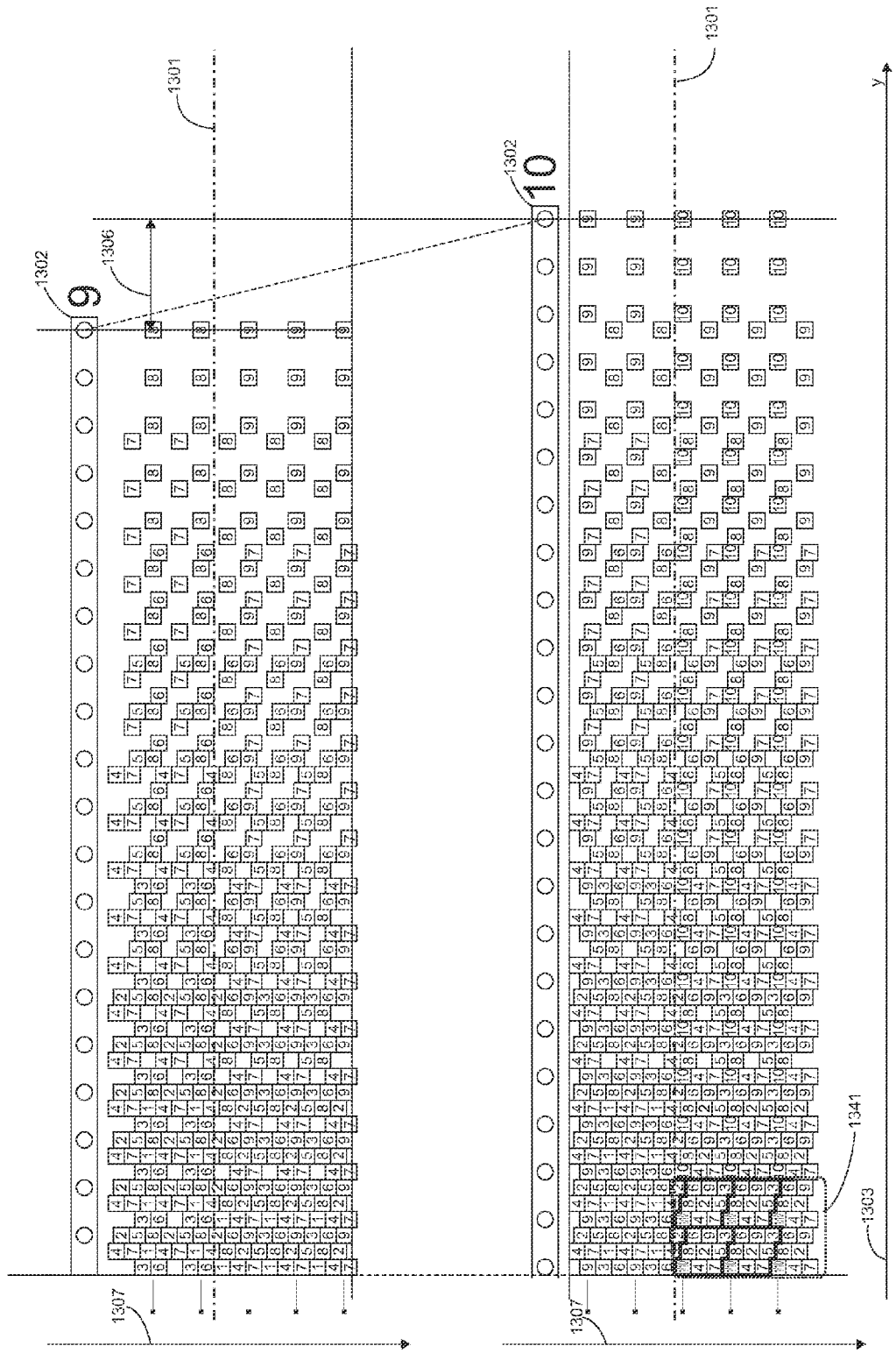
Figure 13J:
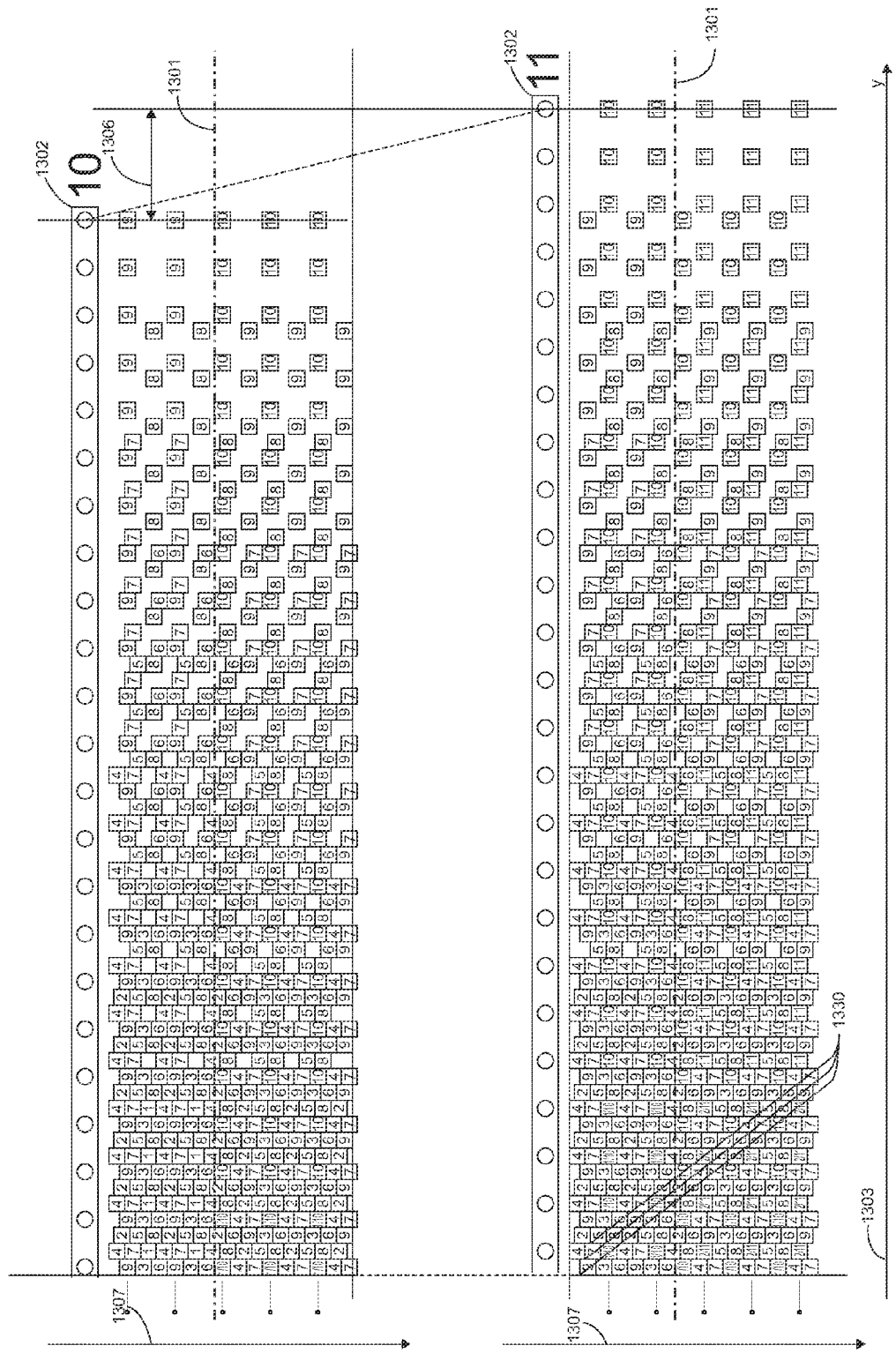

Referring to the lower part in FIG. 13H, it can be seen that at the start of a ninth revolution the printhead is in a position "9" and is printing pixels marked with order number 9. It can also be seen that order numbers of the marked pixels form a pattern of parcels that are very similar to the parcel shown in FIG. 10 and that is also created by the printing sequence shown in FIG. 8 and FIG. 9. The difference between the pattern of parcels created in FIG. 8 and FIG. 9 and the pattern of parcels created in FIG. 13A to FIG. 13J is that the parcels in FIG. 13H are slightly skewed in the fast scan dimension (over a distance of fPixelPitch=fMarkPitch/InterlacingFactor) compared to the parcels in FIG. 8 and FIG. 9.

This skewing, however, does not affect the main characteristics of the pattern of parcels. For example, just like in FIG. 8 and FIG. 9 the diagonal strings of marked pixels (reference mark 1330 in FIG. 13J) in combination with partial curing promote the formation of walls of partly solidified ink that limit the migration of ink droplets during subsequent revolutions.

Also, just like in FIGS. 8 and 9, the specific order that pixels are marked spatially diffuses nozzle correlated image quality artifacts.

After the ninth revolution a portion of the first intermediate layer (region 1340 in FIG. 13H) is completed. During the tenth revolution the print head is in a position 10 and pixels are marked with order number "10" that fall exactly on top of pixels that were previously marked "1" (region 1341 in FIG. 13I). These newly marked pixels belong to a second intermediate layer.

More specifically, in the overlap zone between the area where pixels are marked with "1" and the area where pixels are marked with "2", the pixels marked with "10" belong to a second intermediate layer on top of a first intermediate layer, whereas in the area where pixels are marked with "2" in the absence of pixels marked with "1", these pixels belong to a first intermediate layer.

Similarly to what is shown in FIG. 8 and FIG. 9, the reconstruction of the lower intermediate layers continues during subsequent revolutions, while at the same time additional layers are created on top of these lower intermediate layers.

Figure 11:
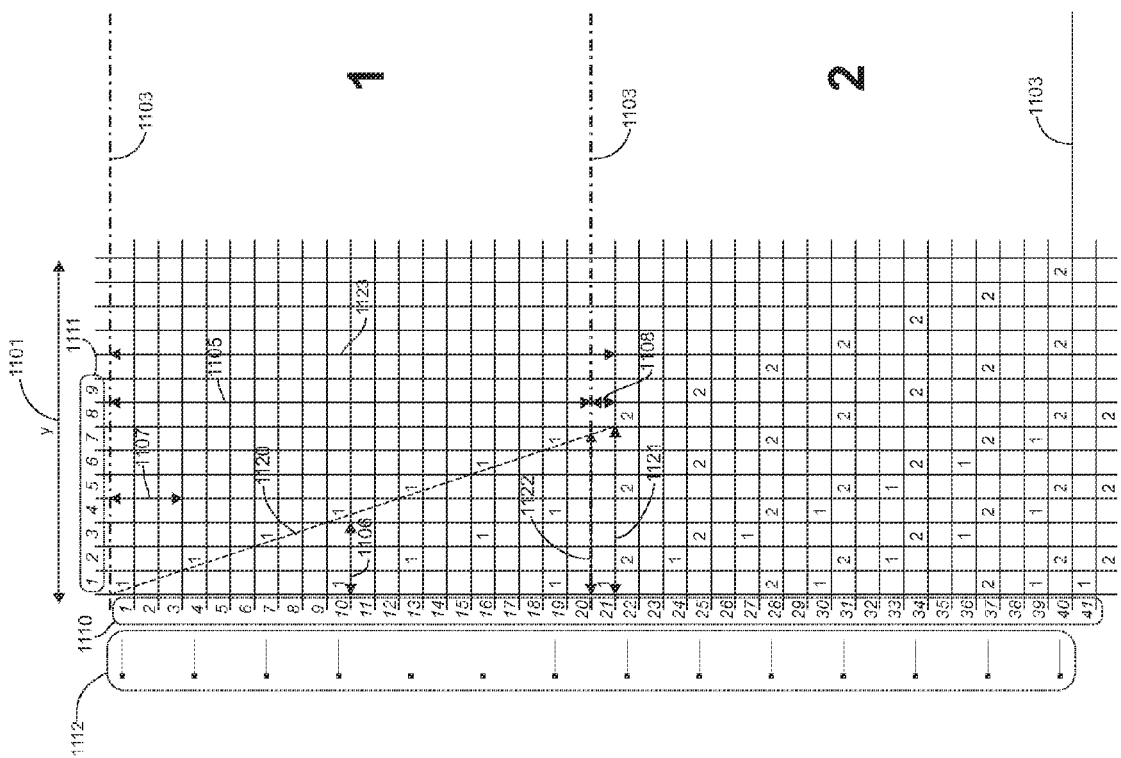
FIG. 11 illustrates a method according to a preferred embodiment of the current invention for building up a first intermediate layer during a first and a second revolution of the drum in the apparatus shown in FIG. 7.
Figure 12:
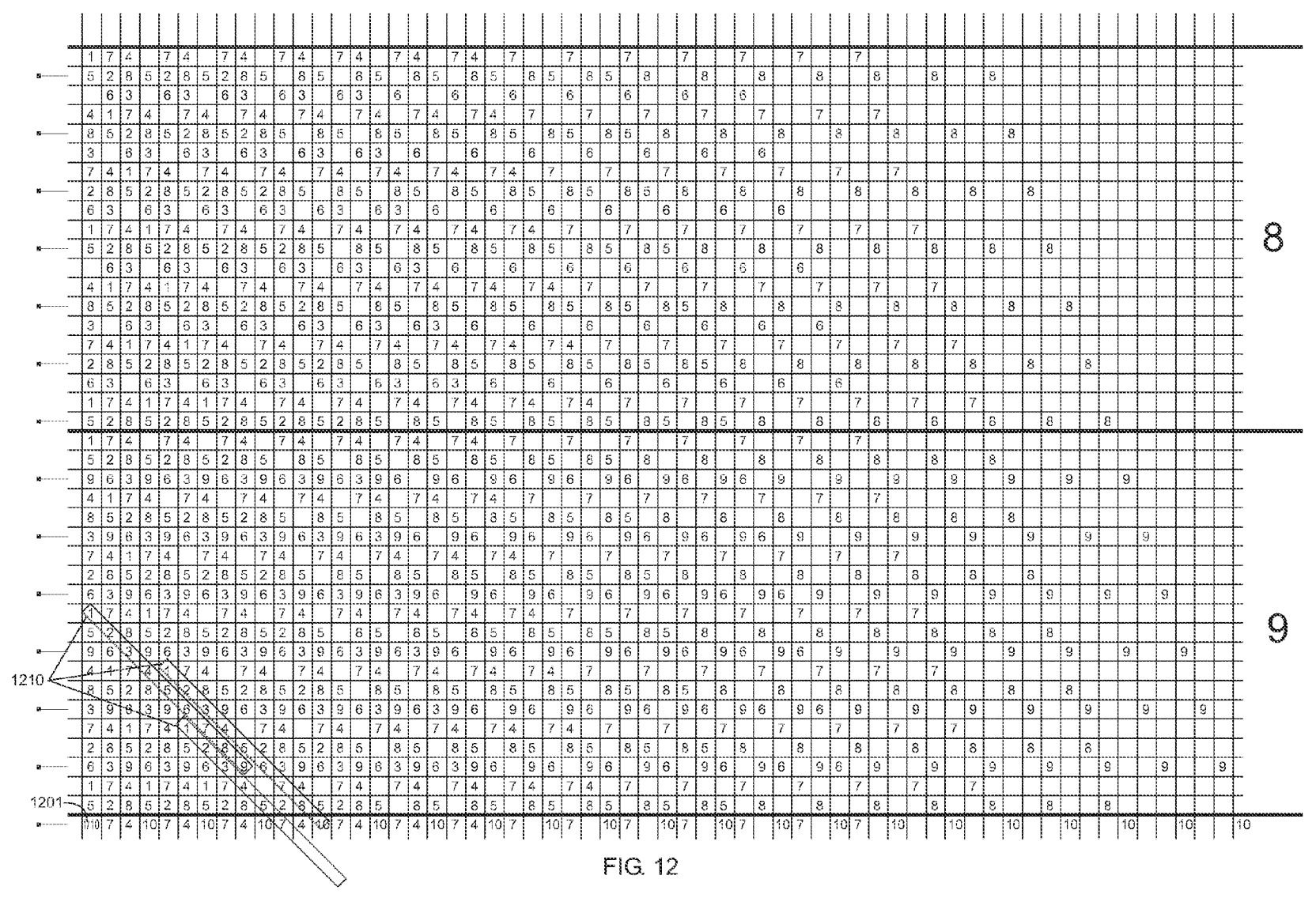

Because the pixels of the lower intermediate layers are printed with different nozzles than the pixels printed with upper layers, the method shown in FIG. 13A to 13J also achieves excellent diffusion of nozzle correlated image quality artifacts. Relief Print Master Reconstruction (Third Preferred Embodiment, cfr. FIG. 7, FIG. 11 and FIG. 12)

FIG. 11 shows a flat projection of the surface area of the flexographic relief printed on the support layer 720 shown in FIG. 7.

The reference sign 1101 corresponds with the slow scan dimension y. The distance 1105 corresponds with the length of the circumference of the sleeve and has a value equal to "Circumference".

The reference sign 1106 corresponds with the distance "NozzlePitch" along the slow scan dimension between two neighboring nozzles of a printhead.

The reference sign 1103 refers to the date line. Its role is the same as the date line in FIG. 13A to FIG. 13J.

The marked pixels on the printed surface are addressed with a row index number 1110 and a column index number 1111. Unlike in FIGS. 13A and 13B, all the pixels are laid out on a rectangular grid.

The reference sign 1107 refers to the distance "fMarkPitch" between two consecutively printed marks of the printhead during the same revolution.

Its value relates to the values of the length of the circumference, the firing frequency and the rotational speed of the drum in the same way as in the previous preferred embodiment.

Just like in the previous preferred embodiment print resolution is increased by a factor InterlacingFactor in the slow scan dimension and by a factor ShinglingFactor in the fast scan dimension.

In FIG. 11 and FIG. 12, the values of InterlacingFactor and ShinglingFactor are equal to three.

The relations and design considerations with regard to NozzlePitch, fMarkPitch, InterlacingFactor and ShinglingFactor are consistent with the concepts that were discussed in the previous preferred embodiments.

The tick marks 1112 in FIG. 11 indicate in which rows pixels are marked during a specific revolution. During the first revolution (indicated by the large bold number "1") of the drum, pixels that are marked receive an order number 1. Unlike in FIG. 8 and FIG. 9, these pixels are not printed on a line that is parallel to the fast scan dimension x. Rather, since during a revolution the printhead continuously moves in the slow scan dimension to the right, they are printed parallel to a slanted line 1120. In the rows having index numbers 1, 4 and 7, only one pixel is marked. However, as the printhead continuously moves in the slow scan orientation, a second nozzle comes in to the range for marking an additional pixel in row 10. When the row having index number 19 is reached, nozzles can mark three pixels in the columns having indices 1, 4 and 7.

When the drum has completed a first revolution, it continues to turn at the same angular velocity and also the pitch of the tick marks 112 continues without that its frequency or phase are changed.

Pixels that are marked during the second revolution (indicated by the large bold number "2" in FIG. 11) receive an order number 2. As is indicated on FIG. 11, the pixels marked with order number 1 obviously "remain" marked during the second revolution. More generally, the pixels that are printed during a next revolution are added to the already printed pixels during any of the previous revolutions.

In FIG. 11 the reference sign 1121 ("SlowScanPitch") is the distance measured in the slow scan dimension between the first pixel marked with order number 1 during the first revolution and the first pixel marked with order number 2 during the second revolution. This distance was selected such that it is equal to 2+⅓ times the value of NozzlePitch. The effect of including a fraction of ⅓ of the SlowScanPitch is that the pixels that are marked in a subsequent revolution are positioned in a column that is ⅓ of the value of NozzlePitch right to the position of the column to which the pixels belong that were marked in the previous revolution. It also explains why in FIG. 11 the InterlacingFactor is equal to three. The design considerations with regard to selecting a value for the variable SlowScanPitch are further consistent with the concepts that were discussed in the previous preferred embodiments.

In FIG. 11, the pixels marked with "2" during the second revolution are positioned at a distance 1108 lower than the position of the pixels marked "1" during the first revolution. This distance 1108 (called "fShift") is exactly ⅓ of the value of fMarkPitch. In general, pixels marked during a next revolution have a position that is fMarkPitch/ShinglingFactor lower in the fast scan dimension than the position of the pixels marked in a previous rotation. The effect of this selection is that the printing resolution in the fast scan dimension is increased by a factor equal to ShinglingFactor.

The value of fShift is a design variable and is related to the values of Circumference, fMarkPitch and ShinglingFactor. Specifically:

fShift=fMarkPitch/ShinglingFactor in which:

1/ShinglingFactor=1−FRAC(Circumference/fMarkPitch)

or, by substituting fMarkPitch and working out the equation:

1/ShinglingFactor=1−FRAC(FiringFrequency/NbrRevsperTimeUnit)

(FRAC refers to a mathematical function that takes the fractional part of a real number)

In the above equation, FiringFrequency and ShinglingFactor are determined by technical constraints and NbrRevsperTimeUnit is adjusted (with reference to its original value) to the closest available value so that the above equation is met.

In summary, the combined effect of the selection of the values of 1107 (fMarkPitch) and 1121 (SlowScanPitch) is that during a next revolution, pixels are marked next right and next below to the pixels that were marked during a previous revolution.

The pitch 1122 (not to be confused with the SlowScanPitch 1121) is defined as the distance that a printhead travels in the slow scan dimension during exactly one revolution. As it can be seen from FIG. 11, the value 1122 of this pitch is in principle not equal to but slightly shorter than the value of SlowScanPitch 1121.

The reconstruction of a first intermediate layer continues throughout the subsequent revolutions. Because during each revolution neighboring pixels are always marked by different nozzles, the method achieves good spatial diffusion in the fast scan dimension x and the slow scan dimension y of variations that are correlated with individual nozzles.

FIG. 12 depicts how pixels have been marked after an eight and a ninth revolution. The figure demonstrates that pixels that are marked during subsequent revolutions form continuous and interleaving diagonal strings such as for example the strings marked with reference sign 1210. These diagonal and interleaving strings in combination with partial curing form walls of partly solidified ink that limit the migration of ink droplets that are printed during subsequent revolutions.

FIG. 12 also shows the first row of marked pixels of a tenth revolution and how a first pixel of a second intermediate layer is printed. As can be seen, the first pixel marked "10" of this next (second) intermediate layer is printed on top of the first pixel of the previous (first) intermediate layer. Since pixels that are printed on top of each other are printed by different nozzles, the method according to a preferred embodiment of the current invention spatially diffuses variations that are correlated with individual nozzles in the z-dimension. This results in improved smoothness and evenness of the reconstructed print master.

Relief Print Master Reconstruction—Generalization

The above explanation details various preferred embodiments of the invention, and how the various preferred embodiments of the invention achieves its objects. It should be clear however to a person of ordinary skill in the art that numerous modifications exist that achieve the same objects and that use the same inventive principles as the preferred embodiments discussed above. These variations fall within the scope of the current invention.

For example, the specific values that were used for variables such as fPixelPitch, sPixelPitch, SlowScanPitch, fMarkPitch, NozzlePitch, FiringFrequency, NbrofEffectiveNozzles, InterlacingFactor, ShinglingFactor, NbrNozzles, NbrRevsperTimeUnit, number of layers, droplet volume, etc. mainly serve to explain the various preferred embodiments of the invention in the current application. These values should not be interpreted in a way that restricts the scope of the invention.

Whereas a preferred embodiment and two additional preferred embodiments are included in this application that use the same inventive concept for reconstructing a print master, this does not preclude that other preferred embodiments may exist that also use this same inventive concept and that would fall under the scope of the current invention.

Also, whereas the current invention has been described in the context of creating a relief print master, the same inventive concepts can be used for the reconstruction of other three-dimensional objects. The printing of such objects using the described inventive concepts would also fall within the scope of the current invention.

While preferred embodiments of the present invention have been described above, it is to be understood that variations and modifications will be apparent to those skilled in the art without departing the scope and spirit of the present invention. The scope of the present invention, therefore, is to be determined solely by the following claims.

The invention claimed is:

1. A method for printing a three-dimensional image including pixels in a fast scan dimension x, a slow scan dimension y, and a z dimension that is orthogonal to the x and y dimensions on a printable surface by a printhead including a plurality of marking elements, the method comprising the steps of:

subdividing the three dimensional image into multiple two-dimensional images defining multiple two-dimensional intermediate layers parallel to the fast scan dimension x and the slow scan dimension y; and printing the intermediate layers on top of each other in the z dimension by:

moving the printhead and the printable surface relative to each other in the fast scan dimension x to print a first set of pixels along the fast scan dimension x with a first set of marking elements over a first area; and subsequently printing a second set of pixels in the fast scan dimension x with a second set of marking elements over a second area that partially overlaps with the first area to define an overlapping portion and a non-overlapping portion; wherein the second set of marking elements that printed the second set of pixels in the overlapping portion in a second intermediate layer on top of a first intermediate layer is different from the first set of marking elements that printed the first set of pixels in the overlapping portion in the first intermediate layer.

2. The method according to claim 1, further comprising the steps of:

dividing the multiple two-dimensional images into contiguous rectangular parcels of pixels along the fast scan dimension x and the slow scan dimension y;

defining a print order to print the pixels in a first parcel of the contiguous rectangular parcels;

printing the pixels in the first parcel of the contiguous rectangular parcels according to the print order.

3. The method according to claim 1, further comprising the step of:

partially curing the printed first set of pixels.

4. The method according to claim 1, wherein the three-dimensional image represents a relief print master.

5. The method according to claim 1, wherein the three-dimensional image is printed on a cylindrical surface.

6. The method according to claim 5, wherein the three-dimensional image seamlessly spans a circumference of the cylindrical surface.

7. The method according to claim 5, further comprising the steps of:

dividing the multiple two-dimensional images into contiguous rectangular parcels of pixels along the fast scan dimension x and the slow scan dimension y;

defining a print order to print the pixels in a first parcel of the contiguous rectangular parcels;

printing the pixels in the first parcel of the contiguous rectangular parcels according to the print order.

8. The method according to claim 5, further comprising the step of:

partially curing the printed first set of pixels.

9. The method according to claim 5, wherein the three-dimensional image represents a relief print master.

* * * * *